(12) United States Patent
Ikeda et al.

(10) Patent No.: US 10,143,133 B2
(45) Date of Patent: Dec. 4, 2018

(54) COMBINE

(71) Applicant: Kubota Corporation, Osaka-shi (JP)

(72) Inventors: Hiroshi Ikeda, Sakai (JP); Hirotsugu Inoue, Sakai (JP); Tadashi Hamanishi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/520,220

(22) PCT Filed: Sep. 25, 2015

(86) PCT No.: PCT/JP2015/077007
§ 371 (c)(1),
(2) Date: Apr. 19, 2017

(87) PCT Pub. No.: WO2016/147452
PCT Pub. Date: Sep. 22, 2016

(65) Prior Publication Data
US 2017/0311544 A1   Nov. 2, 2017

(30) Foreign Application Priority Data

Mar. 18, 2015  (JP) ................................ 2015-055135
Mar. 27, 2015  (JP) ................................ 2015-067058

(51) Int. Cl.
*A01F 12/50*   (2006.01)
*A01F 12/60*   (2006.01)
(Continued)

(52) U.S. Cl.
CPC ..... *A01D 41/1272* (2013.01); *A01D 41/1208* (2013.01); *A01D 67/00* (2013.01);
(Continued)

(58) Field of Classification Search
CPC .............. A01D 41/127; A01D 41/1208; A01D 41/1272; A01D 41/1274; A01D 41/1275;
(Continued)

(56) References Cited

U.S. PATENT DOCUMENTS

2012/0253611 A1\*  10/2012  Zielke .................. A01D 41/127
                                                                701/50
2014/0262548 A1\*  9/2014  Acheson .............. G01G 11/003
                                                                177/1
(Continued)

FOREIGN PATENT DOCUMENTS

JP         10229740 A    9/1998
JP       2013118857 A    6/2013
(Continued)

*Primary Examiner* — Robert E Pezzuto
(74) *Attorney, Agent, or Firm* — The Webb Law Firm

(57) ABSTRACT

There are provided an engine controlling section for controlling a rotational speed of an engine, a horizontal posture controlling section for rendering a vehicle body frame to a horizontal posture by controlling a posture changing mechanism configured to change a posture of the vehicle body frame by an operation of an actuator utilizing power from the engine, a yield measuring section for measuring a yield of grains stored in a grain tank based on measurement result of a load cell configured to measure a weight of the grain tank, an activation operational tool for outputting an activation signal for activating yield measurement by the yield measuring section, and a yield controlling section configured to provide the engine controlling section with a high speed rotation instruction for driving the engine at a rated rotational speed in response to the activation signal and also to provide the horizontal posture controlling section with a horizontal posture instruction for rendering the vehicle body frame to the horizontal posture.

14 Claims, 14 Drawing Sheets

(51) Int. Cl.
*A01D 67/00* (2006.01)
*A01D 41/127* (2006.01)
*A01F 12/46* (2006.01)
*A01D 69/00* (2006.01)
*G01G 17/00* (2006.01)
*G01G 19/52* (2006.01)
*A01D 41/12* (2006.01)
*G01G 19/12* (2006.01)

(52) U.S. Cl.
CPC .............. *A01D 69/00* (2013.01); *A01F 12/46* (2013.01); *A01F 12/50* (2013.01); *G01G 17/00* (2013.01); *G01G 19/12* (2013.01); *G01G 19/52* (2013.01)

(58) Field of Classification Search
CPC .. A01D 41/1277; A01D 79/005; A01D 67/00; A01D 69/00; G01N 33/10; G01S 19/13; G06F 17/40; G06K 9/00657; G06K 9/46; G06T 1/0007; A01F 12/46; A01F 12/50; A01F 12/60; G01G 17/00; G01G 19/12; G01G 19/52

USPC ............ 177/1; 460/59, 119; 701/25, 50, 129
See application file for complete search history.

(56) References Cited

U.S. PATENT DOCUMENTS

| | | | |
|---|---|---|---|
| 2014/0284118 A1* | 9/2014 | Van Mill ................ | B65G 43/00 177/1 |
| 2014/0286731 A1* | 9/2014 | Van Mill ................ | B65G 67/04 414/21 |
| 2016/0029559 A1 | 2/2016 | Inoue et al. | |
| 2016/0066507 A1* | 3/2016 | Inoue ................... | A01B 79/005 460/59 |
| 2016/0330906 A1* | 11/2016 | Acheson ............... | A01D 41/127 |

FOREIGN PATENT DOCUMENTS

| JP | 201464533 A | 4/2014 |
|---|---|---|
| JP | 2014187945 A | 10/2014 |

* cited by examiner

COMBINE

CROSS-REFERENCE TO RELATED APPLICATIONS

This application is the United States national phase of International Application No. PCT/JP2015/077007 filed Sep. 25, 2015, and claims priority to Japanese Patent Application Nos. 2015-055135 and 2015-067058 filed Mar. 18, 2015 and Mar. 27, 2015, respectively, the disclosures of which are hereby incorporated in their entirety by reference.

TECHNICAL FIELD

The present invention relates to a combine configured to store temporarily in a grain tank an amount of agricultural products that have been harvested while traveling in an agricultural field.

BACKGROUND ART

With such combine as above, grains obtained by threshing grain culms reaped by a reaping unit with a threshing unit are temporarily stored in a grain tank. When the grain tank becomes full, the grains will be discharged from the grain tank onto a truck, etc. A harvesting work on an entire agricultural field is carried out with repetition of storage to the grain tank and discharge from the grain tank described above. According to a combine disclosed in Japanese Unexamined Patent Application Publication Hei. No. 10-229740 (Patent Document 1), in response to an operation on a harvest weight (yield) switch, a weight obtained by subtracting a measured weight of empty grain tank from a measured weight of the grain tank storing grains is obtained as a grain weight (yield) inside the grain tank and displayed as such. With this combine, at the time of harvesting work traveling, a vehicle body horizontal control using a posture changing mechanism is executed, so that the vehicle body is maintained horizontal even on a sloped ground. For this reason, at the time of temporary vehicle stop for effecting a yield measurement, the traveling vehicle body and the grain tank are not necessarily under a parallel posture with each other. On the other hand, accurate weight measurement is not possible unless the traveling vehicle body and the grain tank are under a parallel posture. Thus, at the time of yield measurement, the vehicle body horizontal control will be deactivated and the relative posture between the traveling vehicle body and the grain tank will be shifted into the parallel posture by the posture changing mechanism. Incidentally, since the posture changing mechanism employs an actuator such as a hydraulic cylinder, when the posture changing mechanism is to be driven, it is necessary to raise the rotational speed of the engine sufficiently in advance acting as its power source.

Further, the combine is often equipped with an automatic reaping function configured to allow easy and high-accuracy harvesting operation by detecting unevenness in the field and automatically levelling the reaping height based on the detection and configured also to achieve energy saving by reducing the engine rotational speed to an idling rotational speed at the time of halt of the reaping operation. It is admitted that this automatic reaping function is convenient. However, if a yield measurement is to be effected during execution of the automatic reaping function, as the engine rotational speed is reduced in association with stopping of the vehicle body, an operation is needed for raising the engine rotational speed by deactivating the automatic reaping function, in order to allow the actuator of the posture changing mechanism to function fully.

A load cell used for detecting a weight of a grain tank is disposed generally between a lower portion of the grain tank and the vehicle body frame, as known from e.g. Japanese Unexamined Patent Application Publication No. 2013-118857 (see paragraph [0045], FIGS. 5 and 6) (Patent Document 2). In this way, if a weight detection is effected by the load cell between the portion affected by the weight of the grain tank and the vehicle body frame, the weight of grains inside the grain tank can be detected at any desired timing. Therefore, there is achieved an advantage of the ability to detect weight at any desired timing during a reaping operation, in comparison with an arrangement wherein an amount of grains inside a grain tank is detected by checking whether the grain amount has reached a predetermined level such as a full level or not, by means of an optical sensor a pressure-sensitive sensor disposed at an appropriate portion inside the grain tank. However, with the above-described arrangement of detecting the grain tank weight by a load cell, the grain tank weight detection is effected at a position laterally offset from the position where a bottom screw which is a massive and heavy constituent of the grain tank is present. Therefore, as the weight of the bottom screw per se is located at a position offset from the load cell, thus tending to apply a biased load to the load cell, accurate yield detection would be not possible in particular when the content amount of the grain tank is small, for instance.

BACKGROUND ART DOCUMENTS

Patent Documents

Patent Document 1: Japanese Unexamined Patent Application Publication Hei. No. 10-229740

Patent Document 2: Japanese Unexamined Patent Application Publication No. 2013-118857 (paragraph [0045], FIGS. 5 and 6)

SUMMARY OF INVENTION

Problem to be Solved by Invention

In view of the above-described state of the art, there is a need for a technique that further facilitates a yield measurement operation in a combine. There is also a need for improvement of layout of a load cell relative to a grain tank for allowing accurate yield detection.

Solution

A combine according to the present invention comprises:
a vehicle body frame mounting an engine;
an engine controlling section for controlling a rotational speed of the engine;
a posture changing mechanism for varying a posture of the vehicle body frame by an operation of an actuator that uses power from the engine;
a horizontal posture controlling section for setting the vehicle body frame to a horizontal posture by controlling the posture changing mechanism;
a grain tank mounted on the vehicle body frame and configured to store grains conveyed from a threshing device;
a load cell for measuring a weight of the grain tank;

a yield measuring section for measuring a yield of the grains stored in the grain tank based on measurement result of the load cell;

an activation operational tool that outputs an activation signal for activating yield measurement by the yield measuring section; and a yield controlling section configured to provide a high-speed rotation instruction for causing the engine to be driven at a rated rotational speed to the engine controlling section, in response to the activation signal and configured also to provide a horizontal posture instruction for setting the vehicle body frame to a horizontal posture to the horizontal posture controlling section by an operation of the posture chaining mechanism.

With the above-described arrangement, when it is desired to effect a yield measurement, with an operation on the activation operational tool for activating the yield measurement, the engine will be automatically rendered into a high speed and driven at a rated rotational speed, even when the engine is currently being rotated at a low speed for the sake of energy saving for instance. Therefore, even in case the vehicle body frame needs to be returned to the horizontal posture prior to the yield measurement, sufficient power can be supplied from the engine rotated at a high speed to the actuator of the posture changing mechanism. As a result, the posture changing operation by the posture changing mechanism can proceed smoothly.

According to one preferred embodiment of the present invention, the combine further comprises:

a working state determining section for determining whether the combine is under a working state or a non-working state;

a working managing section for selectively setting a non-working mode in which the engine controlling section is provided with a low-speed rotation instruction for driving the engine at a zero-load rotational speed in the case of determination of non-working state or a working mode in which the engine controlling section is provided with the high-speed rotation instruction in the case of determination of working state; and wherein the yield controlling section, when receiving the activation signal, provides the high-speed rotation instruction to the engine controlling section, with priority over the working managing section, irrespectively of a mode set by the working managing section.

With the above-described arrangement, the working managing section sets either the working mode or the non-working mode in the control system and in the non-working mode a control management taking energy saving into consideration is effected. Determination of either the working mode or the non-working mode is effected based on result of determination by the working state determining section. The setting of the working mode is made based on a condition requiring determination of the combine being under a working state. The setting of the non-working mode is based on on a condition requiring determination of the combine being under a non-working state. When the working mode is set, a high-speed rotation instruction is given to the engine controlling section. Whereas, when the non-working mode is set, a low-speed rotation instruction is given to the engine controlling section.

The function of the working managing section effecting the energy saving control management lies in partial automatization of the combine operation by the driver. However, in certain working situations, it may be more appropriate to deactivate such function of the working managing section. For instance, in the case of yield measurement, it is required to drive the engine so that its rotational speed becomes the rated rotational speed, in order to allow the non-traveling operational components to work fully, even under the non-working state in which the combine is stopped. Then, taking such working situations into consideration, according to one preferred embodiment of the present invention, there is provided an accelerator operational tool configured to provide the engine controlling section with a desired rotational speed instruction for causing the engine to be driven at a desired rotational speed when the function of the working managing section is deactivated. A driver can realize a desired engine rotational speed by operating the accelerator operational tool after deactivating the function of the working managing section.

As described above, when the activation operational tool for activating a yield measurement is operated, with priority over the control management by the working managing section, the engine is rotated at a high speed for allowing smooth transition of the vehicle body frame to the horizontal posture required at the time of yield measurement. However, after the yield measurement is completed, such high rotational speed of the engine is no longer needed. For this reason, according to one preferred embodiment of the present invention, if the yield measurement by the activation signal is completed during execution of control by the yield controlling section with priority over the working managing section, the priority of the yield controlling section over the working managing section is cancelled.

In general, a yield measurement is effected prior to the work (grain discharging work) for discharging grains stored in the grain tank to the outside. In other words, a grain discharging work is effected in succession to a yield measurement. Thus, in case the combine is provided with a grain discharging device for discharging grains stored in the grain tank to the outside, it will be advantageous if any one or more or all of power shutoff to reaping work device, return to the reaping work device to a non-working position and fixing of a movable device constituting the grain discharging device is/are effected.

In regard to a shape of a grain tank and layout of a load cell, a combine comprises:

a vehicle body frame;

a grain tank mounted on the vehicle body frame and having a downwardly narrowed shape, the grain tank being configured to store grains conveyed from a threshing device;

a grain discharging bottom screw provided at a bottom portion of a downwardly narrow portion inside the grain tank; and a load cell configured to measure a weight of the grain tank;

wherein a contacting portion is provided outside downwardly of a position where the bottom screw is located in the grain tank; and the load cell has a detecting portion configured to come into contact with the contacting portion at a position higher than the vehicle body frame and the load cell is mounted and supported on a load cell mounting portion provided at a position lower than the vehicle body frame.

With the above-described arrangement, the contacting portion provided in the grain tank is disposed downwardly of the position where the bottom screw is located. Namely, the grain tank weight is detected by the detecting portion of the load cell from the contacting portion, downwardly of the bottom screw having a heavier weight, rather than a position horizontally away from the presence position of the heavy bottom screw among grain tank constituent components. Therefore, it possible to prevent the weight of the bottom screw per se from acting as a biased load on the load cell. And, there is achieved another advantage that as the load is always applied to the load cell from above irrespectively of the stored amount inside the grain tank, so a yield can be detected easily with high accuracy. Further, the load cell is disposed on the load cell mounting portion whose position is set lower than the vehicle body frame, with the detecting portion of the load cell projecting more upward than the vehicle body frame. With this, there is achieved an advantageous arrangement that the upward projection amount of the load cell relative to the vehicle body frame can be minimized to avoid reduction in the capacity of the grain tank and the load cell can be easily disposed downwardly of the bottom screw at the same time.

According to one preferred embodiment of the present invention, the contacting portion has a downwardly oriented contacting face that comes into direct contact with an upper face of the detecting portion. With this arrangement, the downwardly oriented contacting face of the contacting portion on the grain tank side comes into direct contact with the upper face of the detecting portion of the load cell. Thus, in comparison with an arrangement providing an additional member between the contacting face and the upper face of the detecting portion, the number of components is reduced, thus realizing simplification of the arrangement. Further, it is also possible to avoid inconvenient situation that presence of such additional member therebetween results in disadvantageous increase of the height of the bottom portion of the grain tank by an amount corresponding to such additional member.

In the present invention, preferably, a front wall of the grain tank includes a front portion supporting plate for supporting a front end side of the bottom screw and the contacting portion is attached to a lower end of the front portion supporting plate. With this, the front portion supporting plate formed sturdy for supporting the front end side of the bottom screw is utilized also as an attaching means for attaching the contacting portion, thus, the strength of the front portion supporting plate which is a reinforcing member is effectively utilized and the arrangement of the contacting portion is reinforced.

The grain tank can be configured to be position changeable between a storing position preset on the vehicle body frame and a non-storing position displaced to a vehicle body laterally outer side than the storing position.

In this, still preferably:
a guiding face is provided on the vehicle body frame;
the contacting portion comes into contact with the detecting portion when the grain tank is located at the storing position; and
the grain tank includes a guide roller that rolls on the guiding face while supporting a weight of the grain tank to guide the grain tank from the non-storing position side to the storing position side.

With utilization of the guide roller and the guiding face, the position change of the grain tank between the storing position and the non-storing position can proceed smoothly. The contacting portion is changed in position while being guided smoothly and reliably along the guiding face to the detecting portion capable of detection thereof.

Further, preferably, the guiding face defines a recess portion in which the guide roller drops at the storing position. As the guide roller drops into the recess portion at the storing position, it is possible to simplify the arrangement for causing the contact between the contacting portion and the detecting portion to take place at a predetermined position with high precision.

Still preferably:
In the present invention, preferably,
a front wall of the grain tank includes a front portion supporting plate for supporting a front end side of the bottom screw;
a cutout portion that is upwardly recessed is provided at a lower edge side of the front portion supporting plate; and
a supporting shaft of the guide roller is supported as being fitted in the cutout portion.

With formation of the cutout portion at the lower edge side of the front portion supporting plate, the front portion supporting plate can be utilized as a means for fixing the support shaft of the guide roller, thus achieving further simplification of the arrangement. Further, as the above arrangement allows even further downward extension of the grain tank than the arrangement of attaching the supporting shaft to the lower end of the front portion supporting plate, disadvantageous reduction in the tank capacity can be further suppressed.

Still preferably:
the guiding face is configured to cover the load cell at a position lower than an upper face of the detecting portion; and
the guiding face defines an opening for exposing an upper face of the detecting portion therethrough.

As the upper portion of the load cell other than the detecting portion can be covered by the guiding face for guiding rolling movement of the guide roller, accumulation of dust or soil in the periphery of the load cell can be suppressed with a simple arrangement, without having to provide a cover dedicated therefor.

EMBODIMENTS

Next, embodiments of a combine relating to the present invention will be explained with reference to the accompanying drawings.

Incidentally, in the following explanation of the embodiments, a front/rear direction and left/right direction will be defined as follows, unless indicated otherwise. Namely, a forward traveling direction (see arrow F in FIG. 2) on the forward traveling side at the time of working traveling of a vehicle body is "front", a reverse traveling direction to the reverse or rear side (see arrow B in FIG. 2) is "reverse" (rear). And, the direction on the right side relative to the forward facing posture in the front/rear direction is "right" (see arrow R in FIG. 2) and similarly the direction corresponding to the left side is "left" (see arrow L in FIG. 2).

Figure 1:
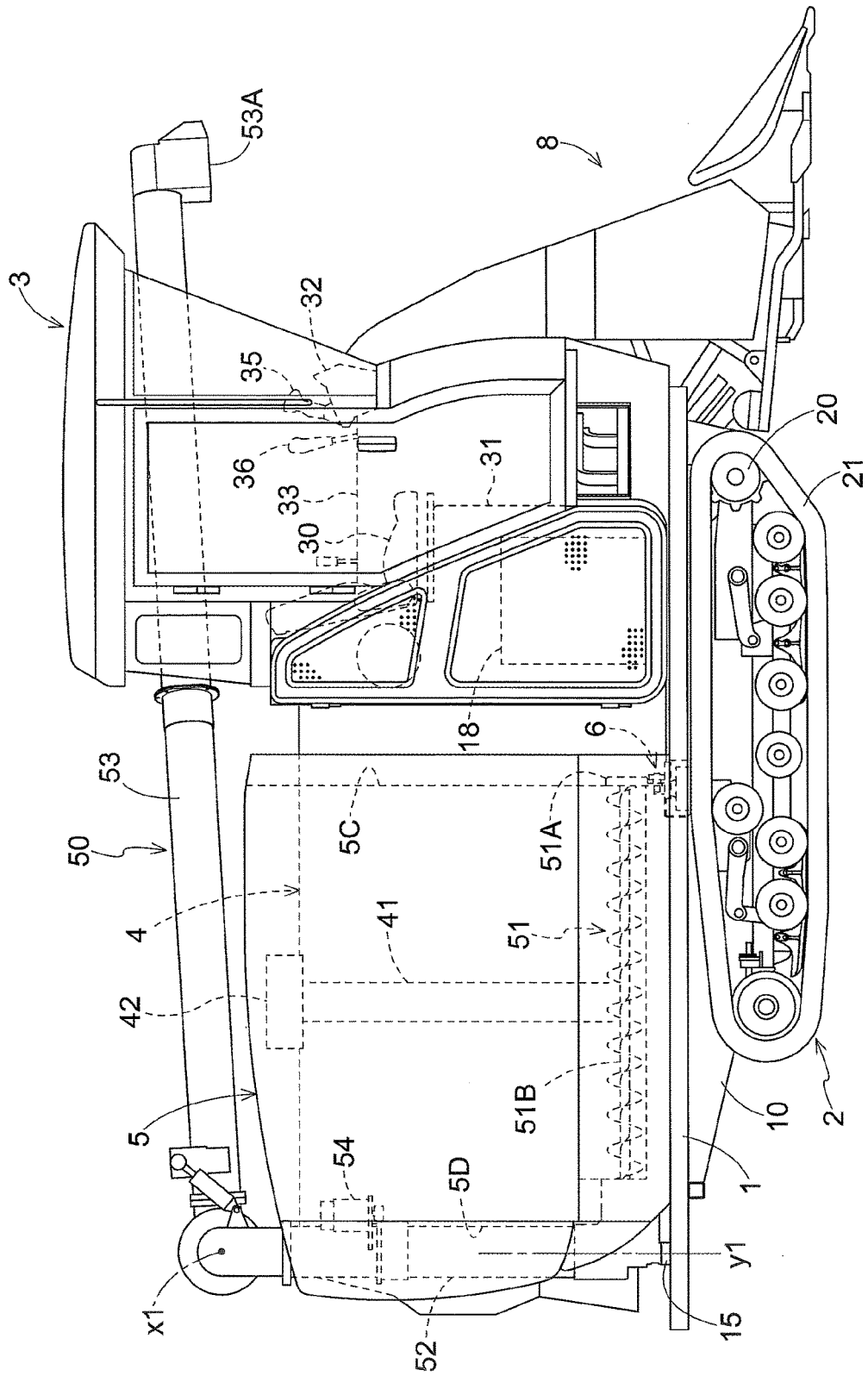
FIG. 1 is an overall side view of a combine.
Figure 2:
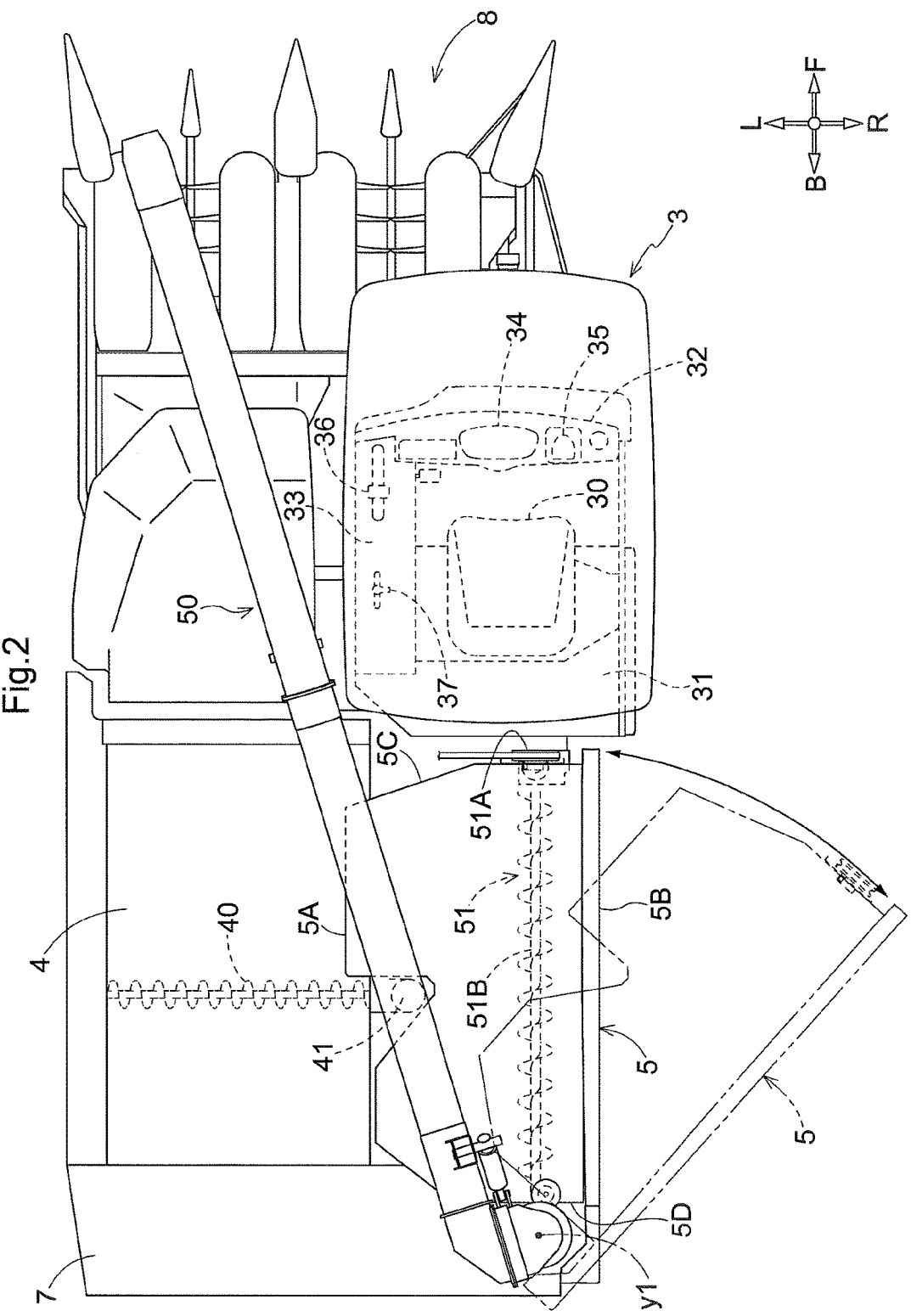
FIG. 2 is an overall plane view of the combine.

A combine shown in FIG. 1 and FIG. 2 is configured as a self-threshing type for raising planted grain culms and effecting reaping and threshing works thereon. This combine is configured also as a self-propelling type having a vehicle body frame 1 supported by a pair of left and right crawler type traveling devices 2. On the vehicle body frame 1, there are mounted such components as a driver's cabin 3, a threshing device 4, a grain tank 5, a waste straw treating device 7, etc.

And, relative to a front portion of the vehicle body frame 1, there is provided a reaping section 8 having its front end side vertically pivotable about its rear end side acting as the pivot axis. With this combined configured as above in operation, planted culms as harvesting objects are raised and reaped and then conveyed toward the rear side of the vehicle body, where they are threshed and sorted by the threshing device 4 and sorted and collected grains thereof are stored in the grain tank 5, whereas waste straws are shredded by the waste straw treating device 7 and then discharged onto an agricultural field.

On the bottom side of the driver's cabin 3, there is disposed an engine hood 31 acting also as a mounting deck for a driver's seat 30. Inside this engine hood 31, an engine 18 is accommodated. Driving power of this engine 18 is transmitted via an unillustrated transmission case from left and right drive sprockets 20 in distribution to crawler belts 21 disposed on the left and right opposed sides. With equal-speed, same-direction rotations of the left and right drive sprockets 20, straight traveling operations in the forward direction or reverse direction are effected. And, with non-equal-speed, same-direction rotations or opposite-direction rotations of the left and right drive sprockets 20, a turning traveling operation is effected.

Inside the driver's cabin 3, a maneuvering panel 32 is disposed at a position forwardly of the driver's seat 30 and a side panel 33 is disposed on the left lateral side of the driver's seat 30. In the front maneuvering panel 32, there are mounted a displaying device 34 and a maneuvering lever 35 which can be operated to the front/rear and left/right sides. The side panel 33 mounts a speed changing operational tool 36 capable of changing traveling speed and a discharging operational tool 37 (see FIG. 2) capable of a swiveling operation and a raising operation of a grain discharging device 50 which will be described later.

The displaying device 34 can display not only a vehicle speed, an engine rotational speed and a fuel remaining amount, but also a yield based on a weight of grains stored in the grain tank 5 and a taste value calculated by measurement of inside quality of a sampled portion of the grains.

The maneuvering lever 35 is configured to effect a lifting/lowering operation of the reaping section 8 by a pivotal operation in the front/rear direction and to effect a steering operation of the vehicle body by a pivotal operation in the left/right direction. Though not shown, the driving power of the engine 18 is transmitted not only to the pair of left and right crawler traveling devices 2 as described above, but also a portion of the power taken off from its traveling transmission line is transmitted via a reaping conveyance transmission line to the reaping section 8. Further, the power from the engine 18 is transmitted to the threshing device 4, and also a power portion taken therefrom is transmitted to the waste straw treating device 7 also. In this way, the transmission system is configured.

The threshing device 4 is configured as follows. Namely, as the stub portions of reaped grain culms conveyed from the reaping section 8 are conveyed as being clamped by an unillustrated feed chain, tip portions thereof are threshed by a threshing drum (not shown) rotatably driven in a threshing chamber, and sorting into grains and dust or waste such as waste straws, etc. is effected by a sorting mechanism (not shown) which is provided at the lower portion of the threshing drum. And, separated individual grains are collected and conveyed into the grain tank 5 whereas the dust/waste is discharged to the outside of the vehicle body. Waste straws after the threshing operation are sent into the waste straw treating device 7 and then shredded by this waste straw treating device 7.

As shown in FIG. 2, at the bottom of the threshing device 4, there is provided a first-product collecting screw 40, which laterally conveys the grains toward the grain tank 5 along the vehicle body lateral width direction. Between the threshing device 4 and the grain tank 5, there is provided a screw-conveyor type grain lifting device 41 as a conveying device operatively coupled with the first-product collecting screw 40 via an unillustrated bevel gear transmission mechanism.

And, as shown in FIG. 1 and FIG. 2, the grains which have been laterally conveyed by the first-product collecting screw 40 are then conveyed upwards by the grain lifting device 41 and then conveyed through a discharge opening 42 formed at the upper end portion of this grain lifting device 41 via a feed opening (not shown) formed at an upper portion of a left side wall 5A of the grain tank 5 to the inside of the grain tank 5. The grain lifting device 41, though not shown, is configured such that a screw shaft is accommodated within a cylindrical tube and at an upper end portion of this screw shaft, there is provided a rotary blade for scattering the grains toward the inside of the grain tank 5, whereby grains can be diffused in maximum-area and stored in uniform distribution within the grain tank 5.

Figure 3:
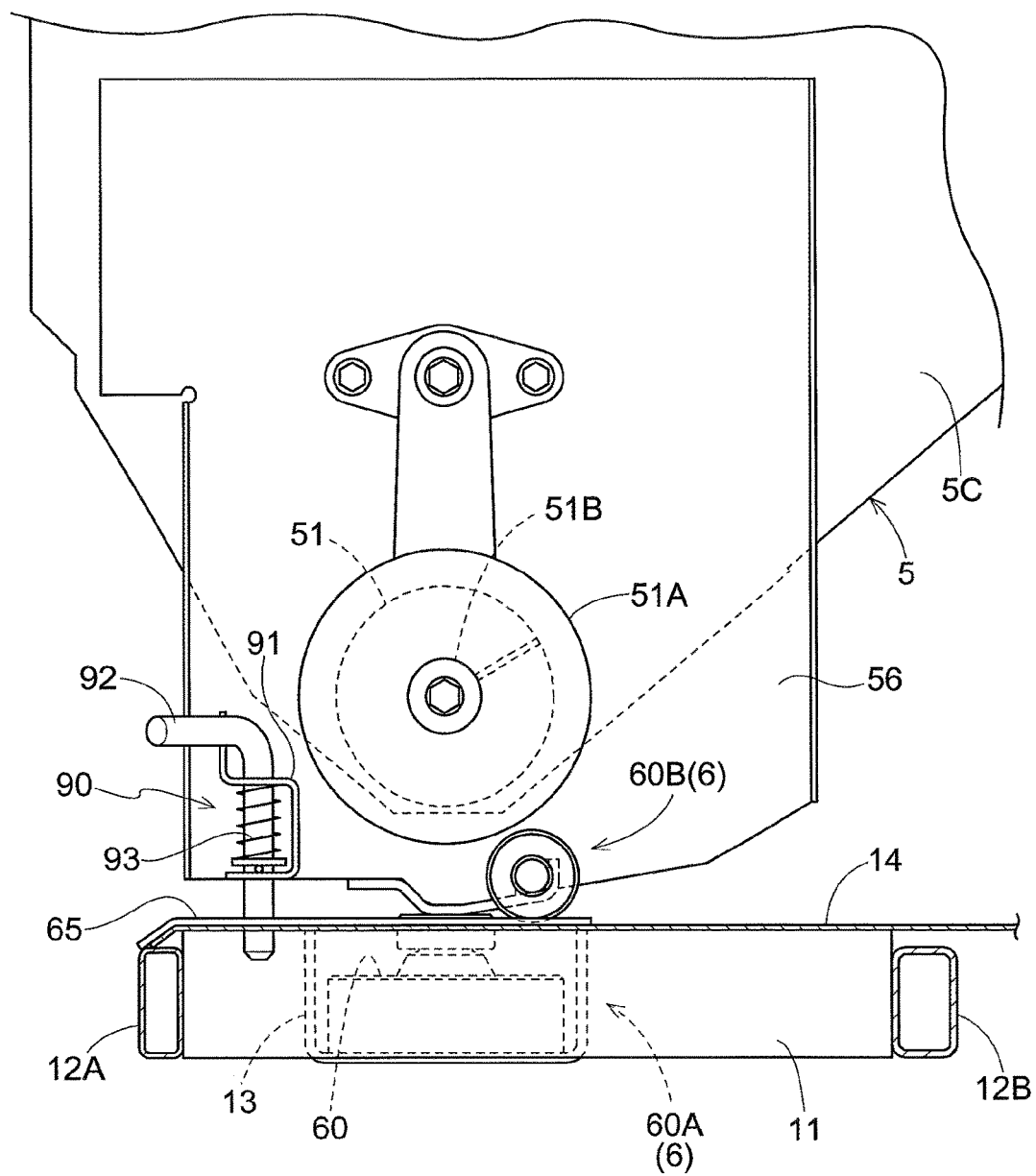
FIG. 3 is a front view showing positional relationship between a weight detecting mechanism and a grain tank on a vehicle body frame.

As shown in FIGS. 1 through 3, the grain tank 5 is formed like a box which is elongate in the front/rear direction, having the left wall 5A on the inner side of the vehicle body, a right wall 5B on the outer side of the vehicle body, a front wall 5C on the front side of the vehicle body and a rear wall 5D on the rear side of the vehicle body. It is noted, however, that at the bottom portion of the grain tank 5, the left wall 5A and the right wall 5B are progressively closer to each other toward the lower side, thus being formed downwardly narrowed. And, at the lowermost position of this downwardly narrowed portion, a bottom screw 51 to be described later is disposed.

This grain tank 5 is configured to be pivotable to the left/right about a vertical axis (y1) provided more rearwardly than the rear wall 5D. And, the grain tank 5 which is pivotable about the vertical axis (y1) can be switched in its posture between a storing position denoted by solid lines in FIG. 2 and a maintenance position (corresponding to a "non-storing position") denoted by virtual lines in the same figure. At a front end portion of the grain discharging bottom screw 51 of the grain tank 5, there is mounted an input pulley 51A. Around this input pulley 51A, there is wound a loop of transmission belt for transmitting the power from the engine 18 though not shown in the drawing, and there is provided a belt tension type discharging clutch for rendering ON/OFF the power transmission by this transmission belt. Therefore, when a position changing operation of the grain tank 5 about the vertical axis (y1) is to be effected, it is necessary that the discharging clutch be switched to the transmission-cutting off state in advance.

The storing position is a preset state wherein the left wall 5A and the right wall 5B of the grain tank 5 which has been pivoted about the vertical axis (y1) toward the vehicle body inner side are aligned along the vehicle body front/rear direction. At this storing position, the grain tank 5 in its substantial entirety is located on the vehicle body frame 1.

Whereas, the maintenance position is a position wherein the front wall 5C of the grain tank 5 which has been pivoted about the vertical axis (y1) toward the vehicle body inner side is oriented toward the right lateral outer side. At this maintenance position, the vehicle body inner side of the grain tank 5 is opened wide, so that the grain tank 5 is rendered into the non-storing state, thus facilitating a maintenance operation.

In the grain tank 5, a front portion supporting plate 56 is attached to the front wall 5C of the grain tank 5, and a rear portion supporting plate (not shown) is attached to the rear wall 5D. These front portion supporting plate 56 and rear portion supporting plate are provided for reinforcement when the heavy bottom screw 51 is to be attached between the front wall 5C and the rear wall 5D. Therefore, the front portion supporting plate 56 and rear portion supporting plate are formed of iron plates having a relatively large thickness and comprise components of substantially same shape formed of strong members having at left and right opposed ends, rib portions raised toward the outer side of the grain tank 5 and support a screw shaft 51B of the bottom screw 51 as extending therethrough. Of the front portion supporting plate 56 and rear portion supporting plate formed of strong members, to the front portion supporting plate 56 on the front wall 5C side farther from the vertical axis (y1), there are mounted a contacting portion 80 and a guide roller 70 of a weight detecting mechanism 6 to be described later.

To a rear end portion of the bottom screw 51 mounted at the bottom portion of the grain tank 5, a vertical feeding screw conveyer 52 is connected via a bevel gear transmission mechanism (not shown) so as to lift-convey the grains which have been received from the conveyance terminal end of the bottom screw 51. To an upper portion of the vertical feeding screw conveyer 52, a base end portion of the lateral feeding screw conveyer 53 for laterally feeding grains lift-conveyed and discharging them through the discharge opening 53A at the leading end thereof is operably connected via a bevel gear transmission mechanism (not shown). The bottom screw 51, the vertical feeding screw conveyer 52, and the lateral feeding screw conveyer 53 together constitute a grain discharging device 50 for discharging grains. By this grain discharging device 50, the grains stored in the grain tank 5 are discharged via the discharge opening 53A to the outside.

The vertical feeding screw conveyer 52 is configured to be pivotable about the vertical axis (y1) which is the pivot center of the grain tank 5 in response to activation of an electric motor 54 having a speed reduction mechanism, whereas the lateral feeding screw conveyer 53 is configured to be vertically pivotable about a horizontal axis (x1) at a base end portion by means of a hydraulic cylinder 55. Therefore, with an operation on a discharging operational tool 37 provided in the side panel 33, the lateral feeding screw conveyer 53 can be pivoted and lifted up/down, thus changing the position of the discharge opening 53A. With this, a discharging position of grains can be changed in correspondence with e.g. a position of a load carrying deck of a transporter truck present on the outside of the vehicle.

A yield amount of grains stored in the grain tank 5 is detected by the weight detecting mechanism 6 mounted on the vehicle body frame 1. This weight detecting mechanism 6 is configured as follows. As shown in FIG. 3, the weight detecting mechanism 6 comprises an assembly of a lower side detecting portion 60A fixedly mounted at a storing position corresponding portion on the vehicle body frame 1 and an upper side detecting portion 60B attached to the grain tank 5 side and position-movable together with the grain tank 5. Further, the weight detecting mechanism 6, as shown in FIG. 1, is mounted on the vehicle body frame 1 at a position of substantially same height as the pivot portion of a turning supporting portion 15 having the vertical axis (y1) as the turning center of the grain tank 5 pivotally supported to the vehicle body frame 1.

In the lower side detecting portion 60A, as shown in FIGS. 3 through 7, a load cell 60 for measuring a weight of grains stored in the grain tank 5 is mounted on the vehicle body frame 1 so as to be able to receive the load of the grain tank 5 located at its storing position and measure its weight. In this lower side detecting portion 60A, as a mounting arrangement for mounting the load cell 60 on the vehicle body frame 1, there is employed an arrangement wherein a load cell supporting frame 13 is fixed to front/rear oriented frames 12A, 12B extending along the front/rear direction and to laterally oriented frame 11 disposed in the left/right direction. And, the load cell 60 is mounted on a bottom face 13A (corresponding to a "load cell mounting portion") of this load cell supporting frame 13. The front/rear frames 12A, 12B are constituted of angular pipes. The laterally oriented frame 11 is bridged between the front/rear oriented frames 12A and 12B. The laterally oriented frame 11 is constituted of a plate-like frame member. The front/rear oriented frames 12A, 12B and the laterally oriented frame 11 together constitute the vehicle body frame 1.

In the upper detecting portion 60B, a contacting portion 80 having a downwardly oriented contacting face 80A opposed to a pressure receiving face 63A is provided under the front portion supporting plate 56 of the grain tank 5 so as to allow the weight of the grain tank 5 side to affect accurately the pressure receiving face 63A as the upper face of the detecting portion 63 of the load cell 60 side. Further, in this front portion supporting plate 56, there is provided a guide roller 70 for allowing smooth movement of the grain tank 5 on the vehicle body frame 1 in the horizontal direction.

In the lower side detecting portion 60A, a guide plate 65 having a guiding face for allowing rolling of the guide roller 70 on the grain tank 5 side is provided on the vehicle body frame 1. This guide plate 65 is attached to the upper faces side of the front/rear oriented frames 12A, 12B and the laterally oriented frame 11 together constituting the vehicle body frame 1. This guide plate 65 includes not only the guiding face portion on which the guide roller 70 rolls, but also a covering face portion for covering entirely the portion where the load cell 60 is present. Namely, at the position of the guide plate 65 opposed to the detecting portion 63 of the load cell 60, there is provided a detection opening 66 having a size capable of exposing only the detecting portion 63. With this arrangement, on the detecting portion 63 of the load cell 60 attached to the bottom face 13A of the load cell supporting frame 13 as the face acting as a load cell mounting portion is exposed through the detection opening 66, while the remaining portion is concealed under the guide plate 65.

As the load cell 60 is attached in such manner that the bottom face of this load cell 60 is mounted on the bottom face 13A of the load cell supporting frame 13, the attaching height thereof is reduced. As a result, the pressure receiving face 63A of the detecting portion 63 of the load cell 60 is disposed at a height near the upper face of the guide plate 65. The pressure receiving face 63A of the detecting portion 63 of the load cell 60 exposed through the detection opening 66 is set at a position slightly higher than the upper face of the guide plate 65.

In the guide plate 65, of its upper face, an area thereof for guiding the rolling movement of the guide roller 70 constitutes a guiding face, whereas the area thereof located at the position covering the upper portion of the load cell 60 and excluding the area where the detection opening 66 is formed constitutes a covering face portion. In the case of such functional division as above, the area of the covering face portion and the area of the guiding face portion on the guide plate 65 are partially overlapped with each other, and a portion having both the functions is present on the guide plate 65. In the guide plate 65, at the portion thereof located at the innermost side of the traveling vehicle body 10, there is formed a through hole 69 for a wire harness 60a for the load cell 60.

On the vehicle body frame 1, the position where the load cell 60 is to be disposed is set in a manner described below.

Figure 4:
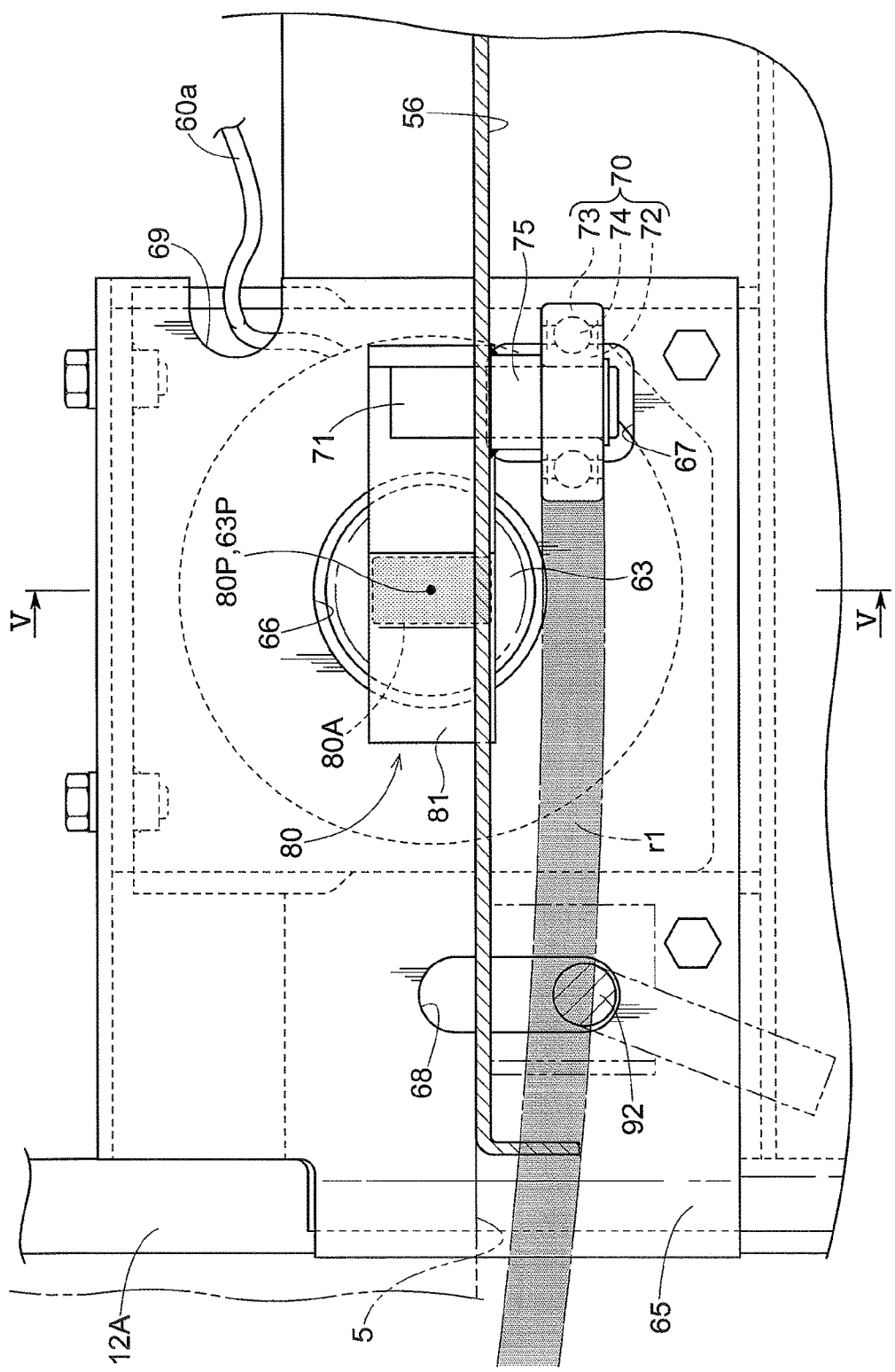
FIG. 4 is a plane view showing the positional relationship between the weight detecting mechanism and the grain tank on the vehicle body frame.
Figure 5:
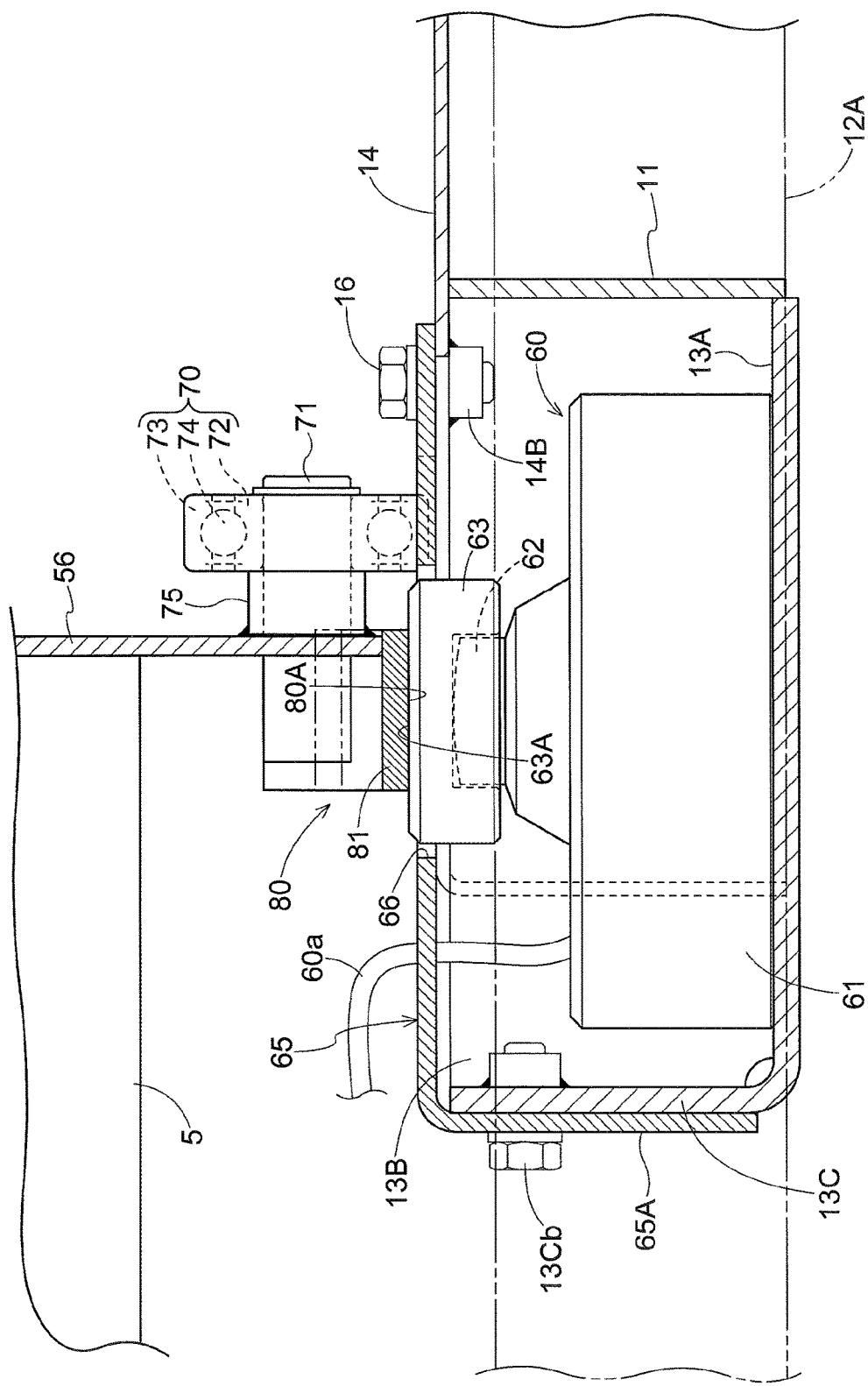
FIG. 5 is a section view taken along a line V-V in FIG. 4.

As shown in FIGS. 3 through 5, the position of the load cell 60 is a position where the detecting portion 63 of the load cell 60 is located immediately below the bottom screw 51 disposed at the bottom portion of the grain tank 5 at its storing position and immediately downwardly of the grain tank 5.

This position, as shown in FIG. 4, is a position where the detecting portion 63 of the load cell 60 is offset on the side nearer the vertical axis (y1) of the grain tank 5 than a movement locus (r1) of the guide roller 70 as seen in a plane view. Namely, the load cell 60 is disposed such that the detecting portion 63 may be located on the side nearer the vertical axis (y1) than the movement locus (r1) on the inner end side in the radial direction of the guide roller 70 which is pivotally operated about the vertical axis (y1). Thus, while the guide roller 70 is moved back and forth on the upper face of the guide plate 65, the guide roller 70 will not roll on the pressure receiving face 63A of the detecting portion 63 of the load cell 60.

Further, the position of the load cell 60 as seen in the horizontal direction is set such that the pressure receiving face 63A of the detecting portion 63 of the load cell 60 exposed through the detection opening 66 may be located slightly higher than the upper face of the guide plate 65.

In the guide plate 65, on the movement locus (r1) of the guide roller 70, there is formed a dropping hole 67 (corresponding to a "recess portion") having a rectangular shape, into which the guide roller 70 will drop when the grain tank 5 pivoting about the vertical axis (y1) has reached the storing position. This dropping hole 67 has a length allowing entrance of the lower portion of the guide roller 70 in the front/rear direction of the the movement locus (r1). And, as shown in FIGS. 4 through 7, it is configured such that when the guide roller 70 has dropped into the drop hole 67, the contacting face 80A of the contacting portion 80 may be placed on the pressure receiving face 63A of the detecting portion 63. More particularly, the relative position among the guide roller 70, the contacting portion 80 and the detecting portion 63 as seen in the plane view is set such that the contacting face 80A of the contacting portion 80 may be placed on the pressure receiving face 63A of the detecting portion 63 when the guide roller 70 has dropped into the drop hole 67.

Figure 7:
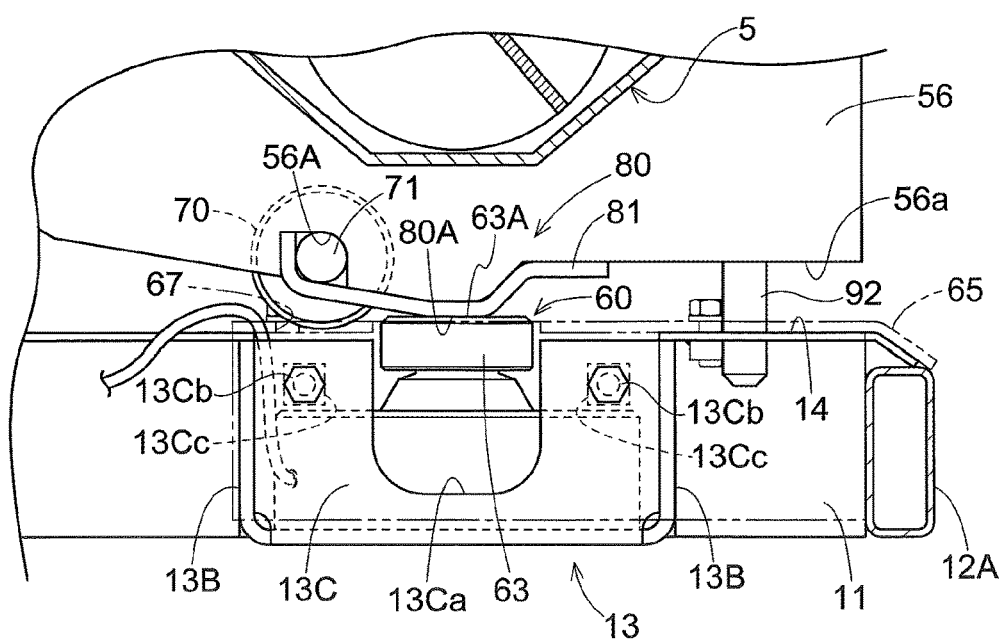
FIG. 7 is a rear view showing the weight detecting mechanism.
Figure 8:
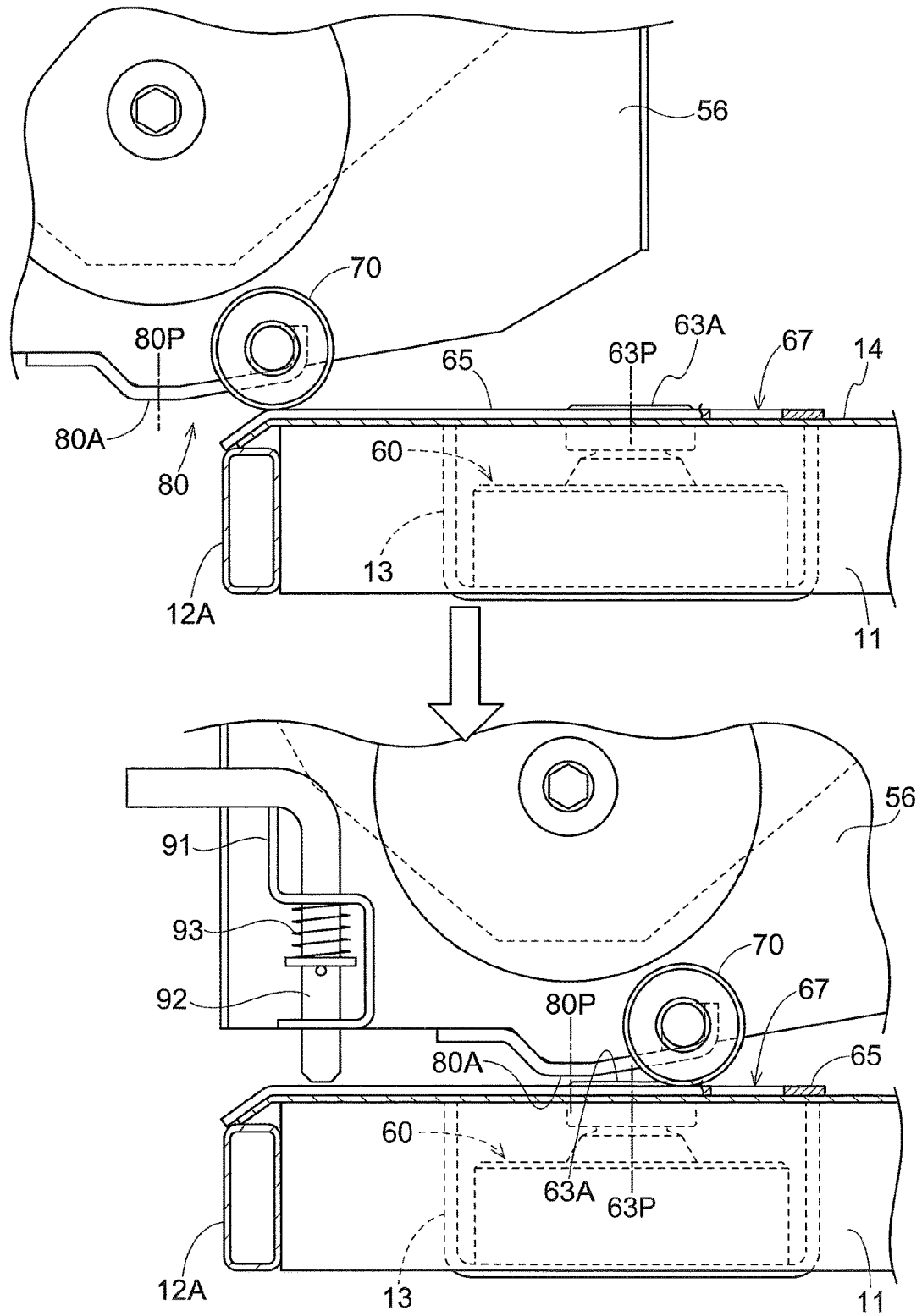
FIG. 8 is an explanatory view as seen in a rear view illustrating an operational state of the grain tank in the weight detecting mechanism.

Further, in the vertical positional relationship among the drop hole 67, the guide roller 70 and the contacting portion 80, as shown in FIG. 8, when the guide roller 70 is rolling on the upper face of the guide plate 65, the contacting portion 80 is located at a position higher than the upper face of the guide plate 65 and the pressure receiving face 63A of the detecting portion 63. As shown in FIG. 7, when the guide roller 70 has dropped into the drop hole 67, the contacting face 80A of the contacting portion 80 is placed on the pressure receiving face 63A of the detecting portion 63.

Under the above-described state, the guide roller 70 is present at the position where the drop hole 67 is present, but this dropped guide roller 70 is not supported by the guide plate 65. Namely, when the guide roller 70 drops into the drop hole 67, in association with this, the contacting portion 80 comes into contact with the detecting portion 63, so that the guide roller 70 even if dropped into the drop hole 67, will be maintained at a position where the guide roller 70 will not drop any further. In this, the guide roller 70 is afloat not in contact with the guide plate 65. Therefore, the weight of the grain tank 5 will not act as a load on the guide roller 70, and the weight of the grain tank 5 can be transmitted to the load cell 60 only via the contact between the contacting portion 80 and the detecting portion 63.

And, as shown in FIG. 2 and FIG. 4, as seen in a plane view, since the guide roller 70 and the contacting portion 80 are located at positions away from the vertical axis (y1) as the pivot center of the grain tank 5 and attached to the front portion supporting plate 56 which is present at the front end portion of the grain tank 5 located at its storing position. Therefore, improvement of detection accuracy can be expected also. Namely, as the presence positions of the contacting portion 80 and the load cell 60 are away from the vertical axis (y1), the position of the load cell 60 at the storing position is also away from the vertical axis (y1) in opposition to the contacting portion 80. If a warping deformation amount is detected at a position away from the vertical axis (y1) as the pivotal center of the grain tank 5 as described above, the warping deformation amount of the grain tank 5 per se due to the weight of grains tends to be relatively large, in comparison with detection at a position near the vertical axis (y1). Therefore, in comparison with e.g. an arrangement wherein the position of the load cell 60 is set near the pivot center of the grain tank 5, so the warping deformation amount due to the weight of the grain tank 5 per se is very small, a deformation amount per unit weight of the grain tank 5 per se can be readily detected by the load cell 60 with high accuracy.

Figure 6:
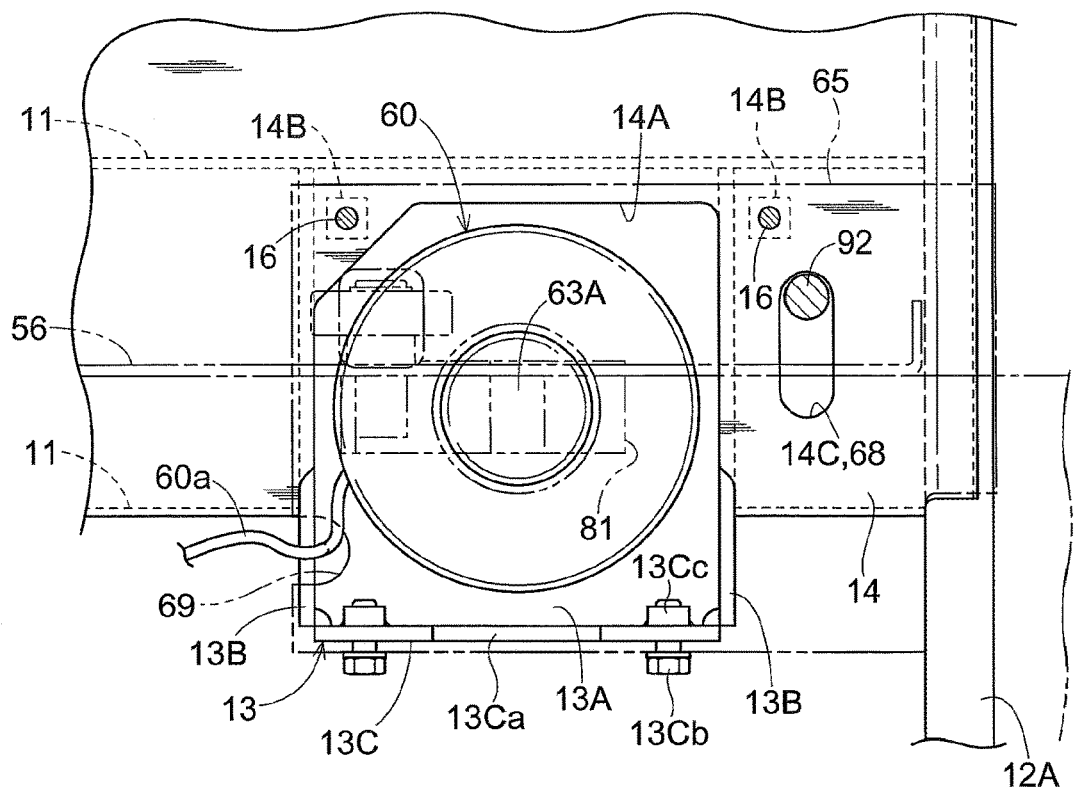
FIG. 6 is a plane view showing the weight detecting mechanism.
Figure 9:
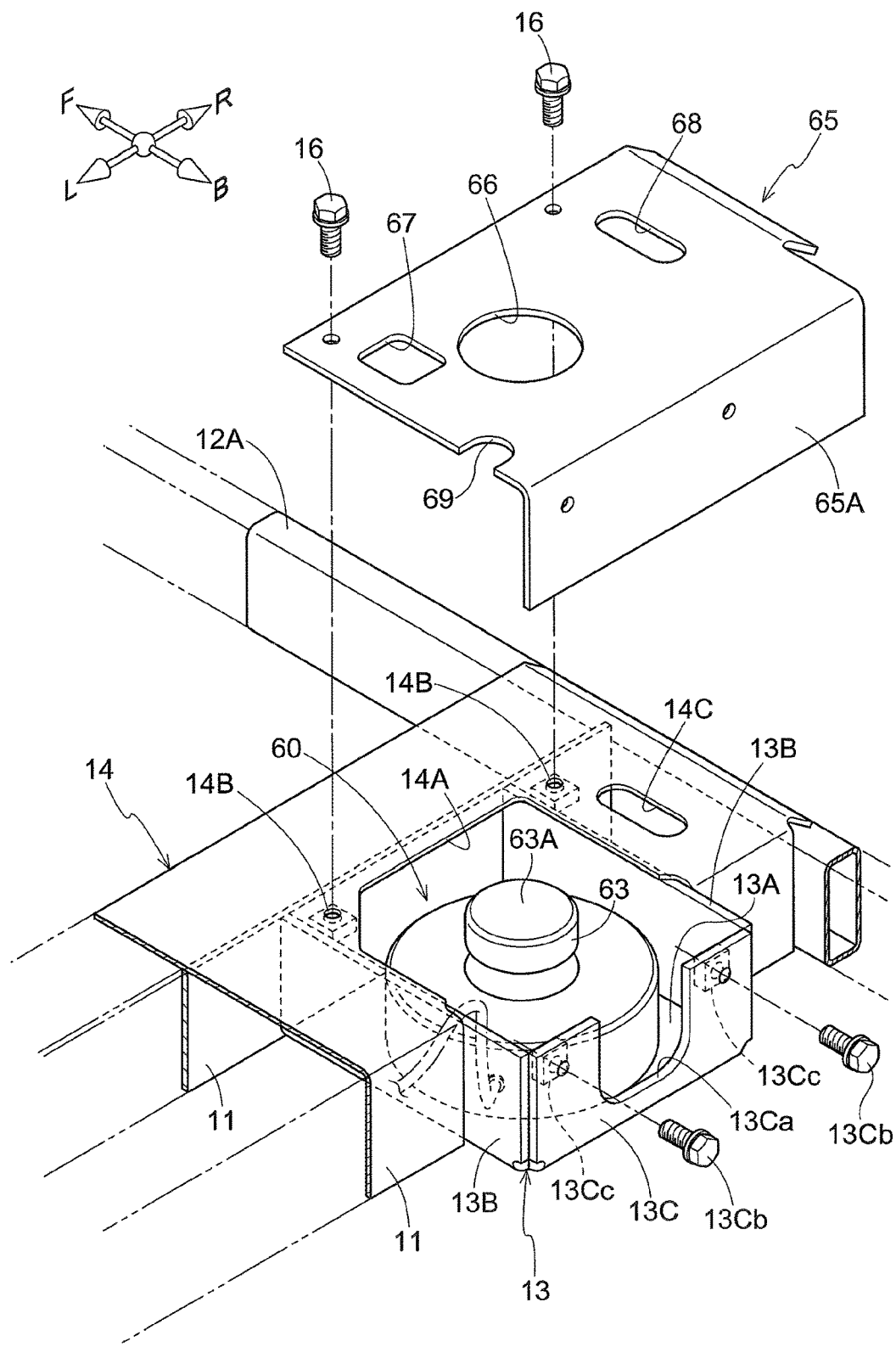
FIG. 9 is an exploded perspective view showing a lower detecting portion of the weight detecting mechanism.

Next, an arrangement for disposing the load cell 60, the guide plate 65, etc. as the lower side detecting portion 60A on the vehicle body frame 1 will be explained. As shown in FIGS. 3 through 7, at a portion corresponding to the lower side of the grain tank 5 located at the storing position and at a portion where the right side front/rear oriented frame 12A, 12B and the laterally oriented frame 11 located on the lower side of the grain tank 5 intersect each other, a mounting plate member 14 is fixedly welded as being connected to the upper face sides of the front/rear oriented frames 12A, 12B and the laterally oriented frame 11. This mounting plate member 14, as shown in FIG. 6 and FIG. 9, defines a cutout opening 14A having a size allowing introduction/withdrawal of the load cell 60 in the vertical direction therethrough. Further, the mounting plate member 14 further defines a retaining hole 14C for a lock pin 92 which will be described later.

On the upper face side of the mounting plate member 14, in order to form bolt holes for interconnecting two portions adjacent the front end edge of the guide plate 65 and the upper face side of the laterally oriented frame 11, stopper nuts 14B are fixedly welded to the lower face side of the mounting plate member 14. This mounting plate member 14 is used also as a fixing means for fixing the load cell supporting frame 13. The guide plate 65 is superposed on the upper side of the mounting plate member 14 and under this state, stopper bolts 16 inserted from the above will be threaded into the stopper nuts 14B and fastened and fixed together. As shown in FIGS. 4 through 9, the load cell supporting frame 13 is bent upwards in three direction of the right side, the left side and the rear side of the bottom face 13A on which the load cell 60 is to be placed. Namely, the load cell supporting frame 13 is formed like a box including raised piece portions 13B, 13B on the right side and the left side of the bottom face 13A and a raised piece portion 13C on the rear side, with the front side and the upper side thereof being opened.

The left and right raised piece portions 13B, 13B of this load cell supporting frame 13 are fixedly welded to the laterally oriented frame 11 on the front side and left and right sides and fixedly welded also to the lower face side of the mounting plate member 14, thus being integrated with the vehicle body frame 1. In the rear side raised piece portion 13C of the load cell supporting frame 13, there is formed a U-shaped cutout 13Ca which is relatively largely opened to the rear side. This cutout 13Ca is provided for allowing scraping out of dust or the like which may have been accumulated on the bottom face 13A of the box-shaped load cell supporting frame 13 at the time of maintenance.

To this rear raised piece portion 13C, there is fixedly welded a stopper nut 13Cc which clamps a suspended portion 65A bent downwards at the rear end side of the guide plate 65 and allowing insertion of a stopper bolt 13Cb from the rear side for fastening.

The load cell 60, as shown in FIG. 5 and FIG. 6, is placed on the load cell mounting portion constituted as the bottom face 13A of the load cell supporting frame 13 and has a cylindrical main body portion 61 integrally fixed to the load cell supporting frame 13 via an unillustrated fixing bolt. At the center of the upper face of the main body portion 61, a projection 62 is formed and on this projection 62, a cap-like detecting member is fitted from the upper side thereof. This detecting member corresponds to the detecting portion 63. The pressure receiving face 63A as the upper face of the detecting portion 63 and the face on the back side thereof are formed in flat faces parallel with each other. The upper face of the projection 62 is formed spherical slightly bulging at the center portion thereof for facilitating receipt of a load at the center portion from the upper side.

Next, an arrangement provided in the upper side detecting portion 60B for mounting the guide roller 70, and the contacting portion 80, etc. will be explained. As shown in FIG. 4, FIG. 5 and FIG. 7, a pivot shaft 71 of the guide roller 70 is fixedly supported in the manner to be described next to the front portion supporting plate 56 provided in the front wall 5C of the grain tank 5.

As shown in FIG. 7, at a lower end edge 56a side of the front portion supporting plate 56, there is formed a cutout portion 56A which is receded toward the upper side. Against a deep right side corner of this cutout portion 56a, the pivot shaft 71 of the guide roller 70 is placed in abutment, and further an upwardly bent upper face side front end portion of a sled-like plate member 81 to be described later is placed in abutment in such a manner as to hold this pivot shaft 71 from the lower side and the left side thereof, and fixedly welded. In this way, with effective utilization of the cutout portion 56A and the sled-like plate member 81, the pivot shaft 71 is fixed to the lower end of the front portion supporting plate 56 by a simple arrangement, not requiring any special pivotal arrangement.

And, to the pivot shaft 71 projecting to the front side of the front portion supporting plate 56, the guide roller 70 is rotatably supported to its shaft end. The guide roller 70 comprises a ball bearing having a ball 74 interposed between an inner race 72 rotatable together with the pivot shaft 71 and an outer race 73. Between the front portion supporting plate 56 and the inner race 72 of the guide roller 70, a tubular spacer 75 is interposed and fixedly welded to the front face side of the front portion supporting plate 56. Therefore, a range of the pivotal function by the front portion supporting plate 56 is extended in the length direction of the pivot shaft 71.

The contacting portion 80 is placed in abutment against the lower end edge 56a of the front portion supporting plate 56 from the lower end side thereof under a posture substantially perpendicular relative thereto and is constituted of the fixedly welded sled-like plate member 81 having a rectangular shape as seen in a plane view.

This sled-like plate member 81 has a curved shape along the lower end edge 56a of the front portion supporting plate 56 and having front and rear opposed ends formed high and a center portion formed low with respect to the pivotal direction of the grain tank 5. In this way, the lower face in the center vicinity portion in the pivotal direction of the grain tank 5 constitutes the downwardly oriented contacting face 80A of the contacting portion 80. The position of the contacting face 80A and the position of the pressure receiving face 63A of the detecting portion 63 when the grain tank 5 is located at the storing position are set such that the weight of the grain tank 5 is detected by the load cell 60 with the contacting face 80A described above rides directly on the pressure receiving face 63A of the detecting portion 63 of the load cell 60.

The guide roller 70 and the contacting portion 80 are operated in association with a pivotal operation of the grain tank 5 about the vertical axis (y1). In this, the relative positional relationship among the guide roller 70, the contacting portion 80 and the detecting portion 63 in the course of the pivotal movement of the grain tank 5 from the non-storing posture to the storing posture varies from the following state (1) to state (2) as illustrated in FIG. 8.

The state (1) shows a riding over start position which is the position where in association with a movement of the grain tank 5 from the non-storing position to the storing position side, the guide roller 70 begins to ride over the guide plate 65 on the vehicle body frame 1.

The state (2) shows a state where the contacting portion 80 is located on a vehicle body laterally outer side off the vehicle body frame 1 and no member or component is placed on the upper face of the detecting portion 63.

The state (2) is a state wherein the guide roller 70 has ridden over the guide plate 65 and rolled on the guide plate 65 so that the grain tank 5 has moved to a position immediately before the storing position. Thus, this is an immediately before storage position of the grain tank 5. At this position, although the contacting portion 80 has reached a position where a portion thereof is placed in opposition to the pressure receiving face 63A of the detecting portion 63, no complete agreement has been reached yet between a center position 80P of the contacting portion 80 and a center position 63P of the pressure receiving face 63A of the detecting portion 63. And, under this state, the contacting portion 80 and the detecting portion 63 have a slight spacing between respectively facing faces thereof, thus being separated from each other.

FIGS. 3 through 7 show a state wherein the grain tank 5 has further moved to reach the storing position. At this storing position, the guide roller 70 has dropped in the drop hole 67 on the guide plate 65, and the center position 80P of the contacting portion 80 is in agreement with the center position 63P of the pressure receiving face 63A of the detecting portion 63. A locking device 90 is attached to the front portion supporting plate 56 of the grain tank 5. This locking device 90 is configured to suppress displacement of the grain tank 5 when the tank 5 is located at the storing position.

The locking device 90, as shown in FIG. 3 and FIG. 8, is provided at a portion of the front face of the front portion supporting plate 56 which is offset laterally outer side in the pivotal movement direction of the grain tank 5, relative to the presence position of the contacting portion 80, thus allowing an easy operation from the vehicle body laterally outer side.

The locking device 90 includes a crank-like mounting bracket 91 fixedly welded to the front face of the front portion supporting plate 56, a lock pin 92 vertically slidable relative to a vertically oriented through hole (not shown) formed in the mounting bracket 91 and a coil spring 93 for elastically urging the lock pin 92 downwards.

In the above-described state (2) in FIG. 8, as an upper portion of the lock pin 92 bent in L-shape is retained to an upper end of the mounting bracket 91, the lock pin 92 is maintained at an upwardly pulled state, namely, an inoperative state, against an urging force of the coil spring 93. Under this state, the lock pin 92 does not contact e.g. the guide plate 65, thus allowing free pivotal movement of the grain tank 5.

When the grain tank 5 is present at the storing position, if the L-shaped bent portion of the lock pin 92 is slightly pivoted in the horizontal direction to release the retention relative to the upper end of the mounting bracket 91, the lock pin 92 will be pushed out downwards by the urging force of the coil spring 93 (see FIG. 3). In this, if the grain tank 5 is located at the storing position, as shown in FIG. 6 and FIG. 7, the lower end of the lock pin 92 is present at a position opposed to a retaining hole 68 and a retaining hole 14C (see FIG. 9) formed in the guide plate 65 and a part of the mounting plate member 14. Therefore, when the grain tank 5 is located at the storing position, the lock pin 92 can be inserted or withdrawn vertically relative to the retaining hole 68 and the retaining hole 14C (see FIG. 9).

In the foregoing embodiment, there was shown an arrangement wherein with use of the contacting portion 80 and the guide roller 70, the grain tank 5 is position changeable between the non-storing position and the storing position. However, the invention is not limited thereto. Instead, it is also possible to employ an arrangement of the grain tank 5 being not position-changeable from the storing position, such as an arrangement wherein the grain tank 5 is configured to be detachably attachable.

In the foregoing embodiment, there was shown an arrangement wherein with use of the front portion supporting plate 56 of the grain tank 5, the contacting portion 80 and the guide roller 70 are supported. However, the invention is not limited thereto. Instead, it is also possible to employ an arrangement wherein a supporting member for reinforcement separate from the front portion supporting plate 56 is provided.

In the foregoing embodiment, there was shown an arrangement wherein as the contacting portion 80, the sled-like plate member 81 is provided to the front portion supporting plate 56 of the grain tank 5 and also this sled-like plate member 81 is attached to project more on the rear side than the front side of the front portion supporting plate 56. However, the invention is not limited thereto.

Instead, it is also possible to employ e.g. an arrangement wherein the sled-like plate member 81 is attached to project by an equal amount on the front side and the rear side, downwardly of the front portion supporting plate 56 or to project more on the front side than the rear side of the front portion supporting plate 56.

Next, with reference to FIG. 10, there will be explained a basic principle of control for novel yield measurement. Incidentally, in this case, the vehicle body frame 1 is attached to the traveling devices 2 via a posture changing mechanism 200. The rotational speed of the engine 18 mounted on the vehicle body frame 1 is controlled by an engine controlling section 141. The posture changing mechanism 200 is configured to change the posture of the vehicle body frame 1 relative to the traveling devices 2 by means of a hydraulic or electric actuator utilizing power from the engine 18. As a control system, there are provided the engine controlling section 141, a device controlling section 142, a yield measuring section 144, a yield controlling section 153, a working managing section 154, and a working state determining section 155. The engine controlling section 141 controls the rotational speed of the engine 18. The device controlling section 142 includes a horizontal posture controlling section 421 for setting the vehicle body frame 1 to a horizontal posture by controlling the posture changing mechanism 200, and a grain discharging controlling section 422 for discharging stored grains from the gran tank 5 to the outside by controlling the grain discharging device 50. The yield measuring section 144 measures a yield of grains stored in the grain tank 5 based on a measurement result of the load cell 60 which is the core constituent component of the weight detecting mechanism 6. The working state determining section 155 determines whether the combine is under a working state or a non-working state, based on detection signals of a working state detecting sensor group 9 which generically includes switches, buttons, sensors, or the like for detecting a working state.

The yield controlling section 153 provides a high rotational speed instruction to the engine controlling section 141 and a horizontal posture instruction to the horizontal posture controlling section 421, in response to an activation signal for activating yield measurement by the yield measuring section 144 which is outputted by an operation on an activation operational tool 9a. The high speed rotation instruction is an instruction for causing the engine 18 to be driven at a rated rotational speed. The horizontal posture instruction is an instruction for setting the vehicle body frame 1 to the horizontal posture by activating the posture changing mechanism 200. The working managing section 154 sets a non-working mode to the control system if the working state determining section 155 determines that the combine is under a non-working state. With this setting of the non-working mode, a low speed rotation instruction is given to the engine controlling section 141 for causing the engine 18 to be driven at a zero-load rotational speed. On the other hand, the working managing section 154, to the control system, sets a working mode which provides a high speed rotation instruction to the engine controlling section 141 if the working state determining section 155 determines that the combine is under a working state. The yield controlling section 153 has a priority control function. According to this priority control function, if an activation signal based on an operation on the activation operational tool 9a is received, the yield controlling section 153 provides the high speed rotation instruction to the engine controlling section 141, with priority over the working managing section 154, irrespectively of any mode set by the working managing section 154.

The working managing section 154 executes an energy saving automatic control for energy saving operation. In this energy saving automatic control, at the time of work traveling, the engine 18 is rotated at a high speed at the rated rotational speed level, whereas at the time of non-work traveling, the engine 18 is rotated at a low speed at the idling rotational speed level. During execution of this energy saving automatic control, there can occur an exceptional work situation wherein an exceptional work other than a reaping work traveling is to be carried out, with stopping of the combine. As examples of such exceptional work (non-working mode), there are a yield measuring work for measuring yield of grains stored in the grain tank 5, and a checking work or setting work of various kinds of functions. In such exceptional works too, it is normally necessary to activate the operational device for posture changing operation of shifting the vehicle body frame 1 to a predetermined posture such as the horizontal posture. As such operational device basically utilizes the engine power, it is necessary to rotate the engine 18 at a high speed at the time of such operation. However, if the above-described energy saving automatic control is currently being executed, in association with stopping of the combine or stopping of a reaping work, the engine 18 is rotated at a low speed, so that the above-described functional device cannot provide its performance fully. In order to avoid this inconvenience, the yield controlling section 153, when receiving an activation signal based on an operation on the activation operational tool 9a, can provide the high speed rotation instruction to the engine controlling section 141, with priority over the working managing section 154. Namely, in response to the activation signal based on an operation on the activation operational tool 9a, the yield controlling section 153 temporarily deactivates the function of the working managing section 154. At the time of such function deactivation of the working managing section 154, an accelerator operational tool 9b is employed for returning setting of the engine rotational speed to the driver. Namely, when the accelerator operational tool 9b is operated, a desired rotation instruction for driving the engine 18 at a desired engine rotational speed based on the amount of that operation is given to the engine controlling section 141.

As the energy saving automatic control by the working managing section 154 is temporarily stopped by the operation on the activation operational tool 9a, the yield controlling section 153 can provide a rotational speed instruction to the engine controlling section 141 with priority over the working managing section 154. Such priority control over the working managing section 154 by the yield controlling section 153 will be cancelled or released after completion of the exceptional work as the cause of this priority control, e.g. the yield measurement, and then the energy saving automatic control by the working managing section 154 will be resumed. That is, if the yield measurement by the activation signal is completed at the time of priority of the yield controlling section 153 over the working managing section 154, the priority given to the yield controlling section 153 over the working managing section 154 will be canceled or released.

Figure 10:
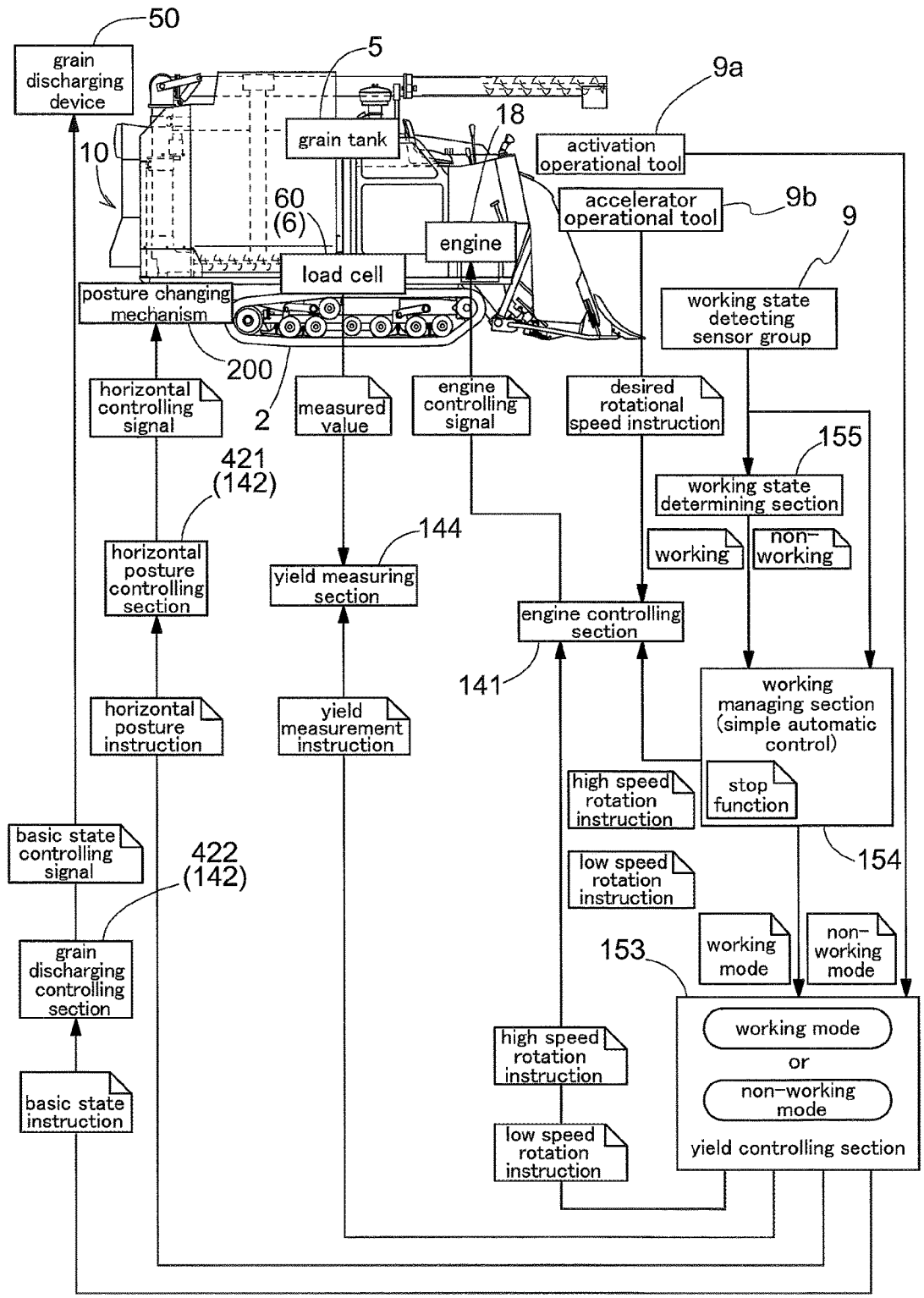
FIG. 10 is a schematic view showing a basic controlling arrangement of the present invention.

Incidentally, FIG. 10 shows the grain discharging device 50 for discharging grains stored in the grain tank 50 to the outside and the grain discharging controlling section 422 for controlling this grain discharging device 50. Yield measurement is effected prior to a grain discharging work using this grain discharging device 50. For this reason, it will be advantageous that the activation operational tool 9a comprise an activation operational tool 9a for grain discharging work. In such case, in response to the activation signal based on an operation on the activation operational tool 9a, the basic state of the grain discharging device 50 will be created. In this basic state, stop of power supply to the harvesting work devices, return of the harvesting work devices to the non-working position and fixing of movable devices constituting the grain discharging device 50, etc. will be carried out. To this end, prior to the yield measurement, a basic state shifting control will be carried out in which the yield controlling section 153 provides a basic state instruction to the grain discharging controlling section 422. and this grain discharging controlling section 422 gives a basic state controlling signal to the grain discharging device 50.

Next, one specific embodiment of the combine suitable for mounting the yield measurement control explained above with reference to FIG. 10 will be explained.

Figure 11:
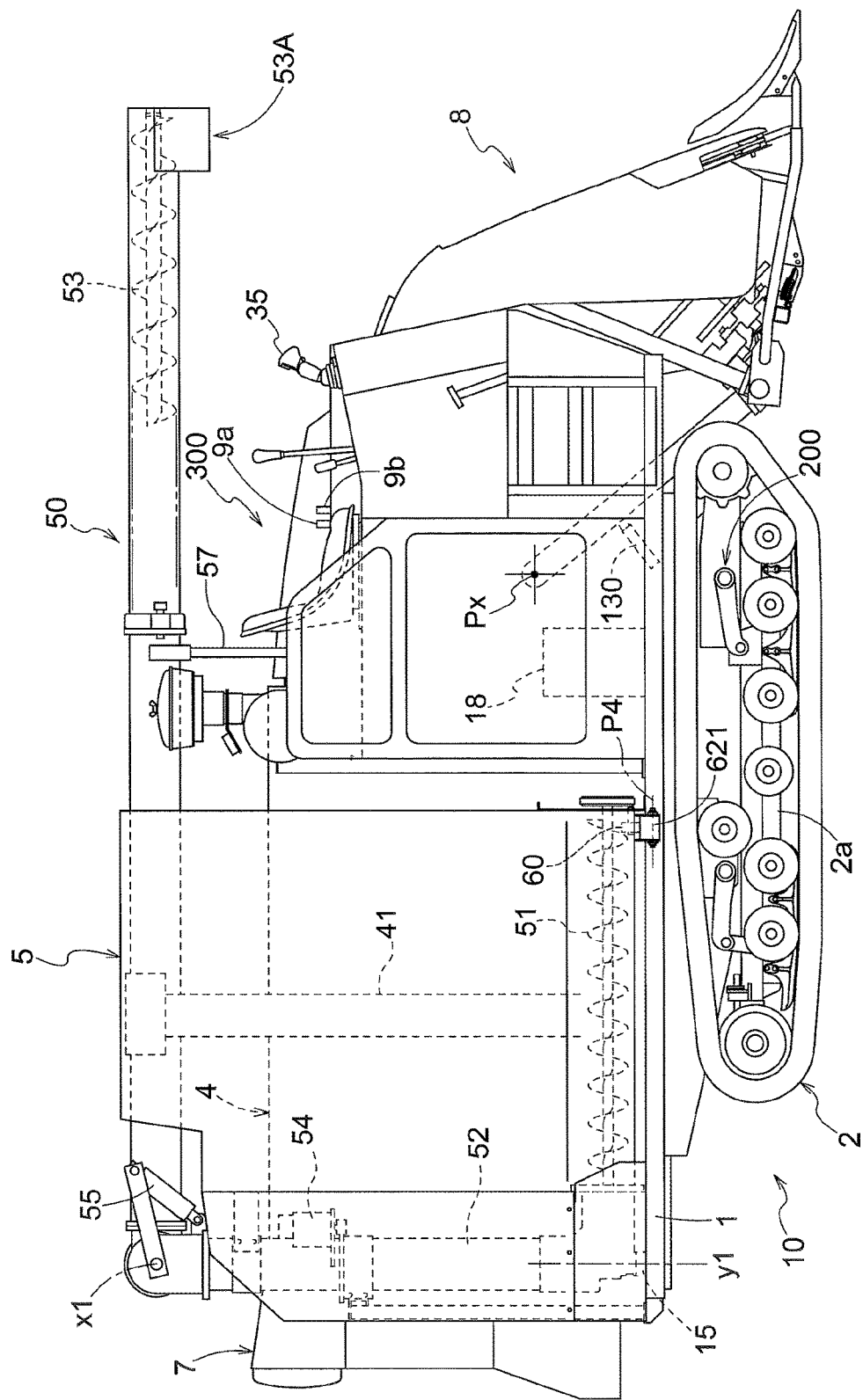
FIG. 11 is a side view showing one embodiment of the combine relating to the present invention.
Figure 12:
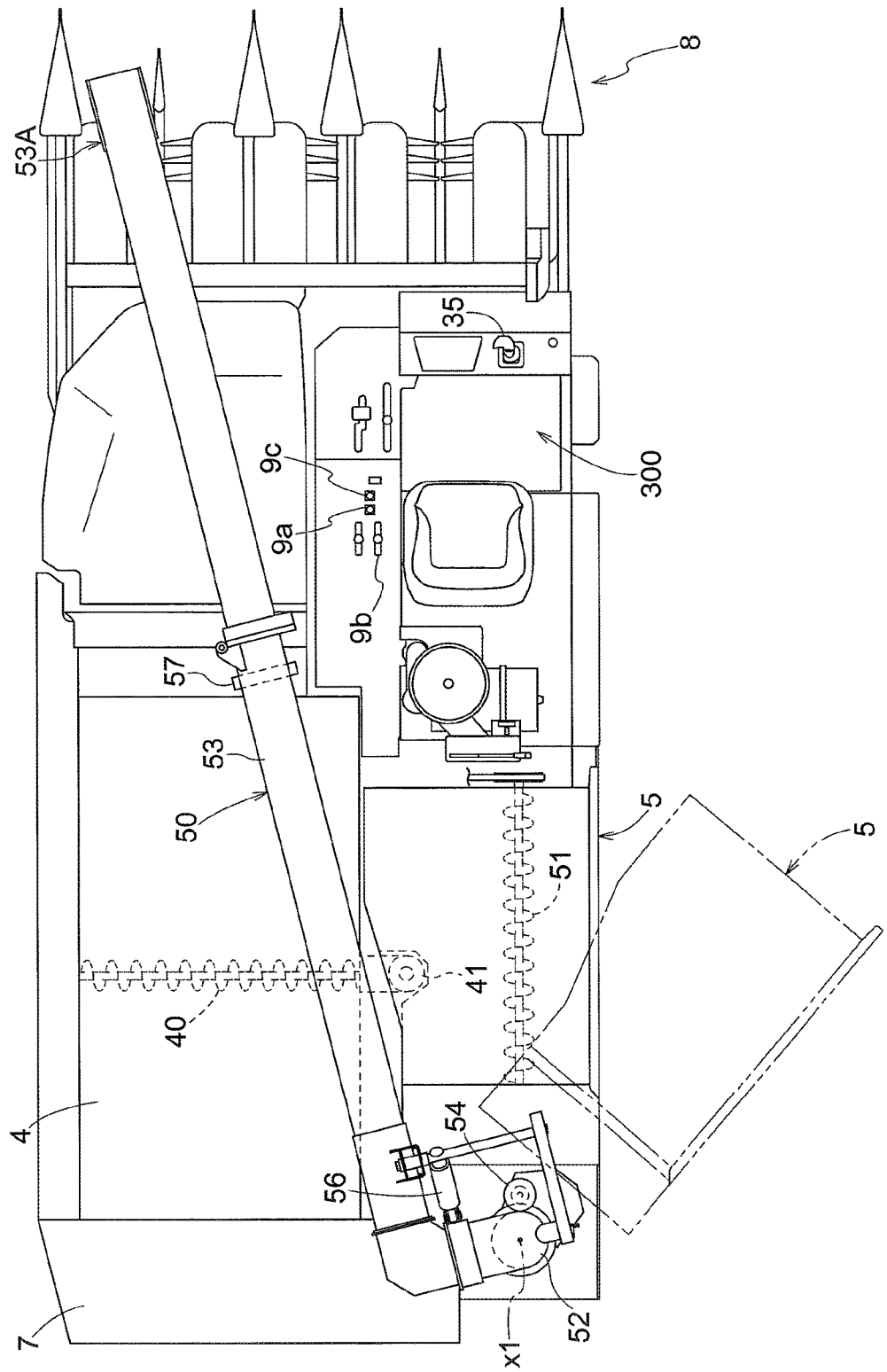
FIG. 12 is a plane view of the combine.

FIG. 11 is a side view of the combine and FIG. 12 is a plane view. This combine is a self-threshing type combine and has a vehicle body frame 1 constituting a traveling vehicle body 10 supported on the ground surface by means of a pair of left and right crawler type traveling devices 2. At a vehicle body front portion, there is mounted a reaping section 8 for reaping erect grain culms as reaping targets and then conveying the reaped grain culms toward the vehicle body rear side. And, rearwardly thereof, there are mounted such devices/components as a maneuvering section 300 having no cabin, the threshing device 4 for threshing and sorting reaped grain culms, the grain tank 5 for storing the grains sorted and collected by the threshing device 4, the grain discharging device 50 for discharging the grains from the grain tank 5, and the waste straw treating device 7 for treating waste straws, and so on. The engine 18 is mounted under the maneuvering section 300.

The reaping section 8 is coupled to the vehicle body frame 1 to be liftable up/down about a vehicle body lateral axis Px. The reaping section 8 is vertically pivoted relative to the vehicle body frame 1 by means of a lift cylinder 130. With this, the reaping section 8 is lifted up/down between to a working state where grass dividers juxtaposed along the traveling vehicle body lateral direction in the front end portion of the reaping section 8 are lowered to the vicinity of the agricultural field surface and a non-working state where the grass dividers are lifted high away from the agricultural field surface.

With the threshing device 4 in operation, tip portions of reaped grain culms conveyed from the reaping section 8 are threshed and then sorted into grains rendered into individual grains and dust or waste such as waste straws by the sorting action of a sorting mechanism (not shown) provided inside the threshing device 4 and then, the individual grains are conveyed as harvested products to the grain tank 5. The waste straws after the threshing treatment will be shredded by the waste straw treating device 7.

As may be understood from FIG. 11 and FIG. 12, there is provided a grain conveying mechanism for feeding grains from the threshing device 4 to the grain tank 5. This grain conveying device consists essentially of a first product collecting screw 40 provided at the bottom of the threshing device 4 and a screw-conveyor type grain lifting device 41. Grains laterally conveyed by the first product collecting screw 40 are conveyed upwards by the grain lifting device 41 and sent into the grain tank 5 via a charge opening formed at an upper part of the grain tank 5. Incidentally, though not shown, at an upper end portion of the grain lifting device 41, there is provided a rotary blade for scattering the grains toward the inside of the grain tank 5, whereby grains can be stored in uniform horizontal distribution within the grain tank 5 as much as possible.

In the maneuvering section 300, as shown in FIG. 12, there are provided the activation operational tool 9a, the accelerator operational tool 9b, a simple automatic control button 9c, and the maneuvering lever 35. When the maneuvering lever 35 is operated in the front/rear direction, the reaping section 8 is lifted up/down, and when the maneuvering lever 35 is operated in the left/right direction, the crawler type traveling devices 2 in the operated direction will be decelerated or stopped, whereby the traveling vehicle body 10 effects a left turn or a right turn. The activation operational tool 9a is used for starting a yield measurement of grains stored in the grain tank 5. The accelerator operational tool 9b is used for manual adjustment of a rotational speed of the engine 18. The simple automatic control button 9c is used for effecting an automatic work driving in which the machine effects an operation at least partially in place of a driver's judgement or an energy saving control operation in which only necessary power is supplied. In the instant embodiment, the simple automatic control button 9c is used as a button for executing an ON setting of a threshing clutch 4a, an ON setting of a reaping clutch 8a, and also engine rotational speed automatic control for rotating the engine 18 at a low speed at the time of non-working, altogether at a time. In the automatic control of engine rotational speed, when the combine is under a working state, the engine rotational speed is maintained at a high speed which is a rated rotational speed, whereas when the combine is under the non-working state, the engine rotational speed is maintained at a low speed which is an idling rotational speed.

Figure 13:
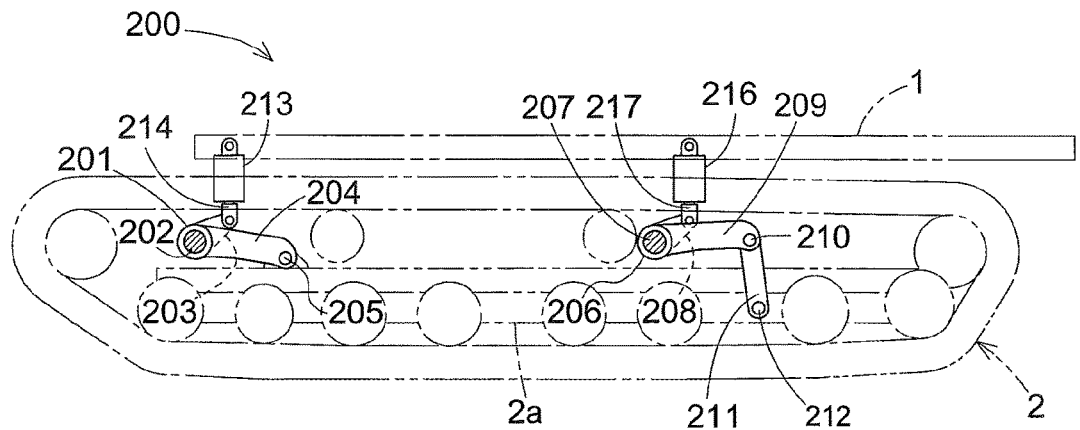
FIG. 13 is a side view schematically showing an arrangement of a posture changing mechanism.
Figure 14:
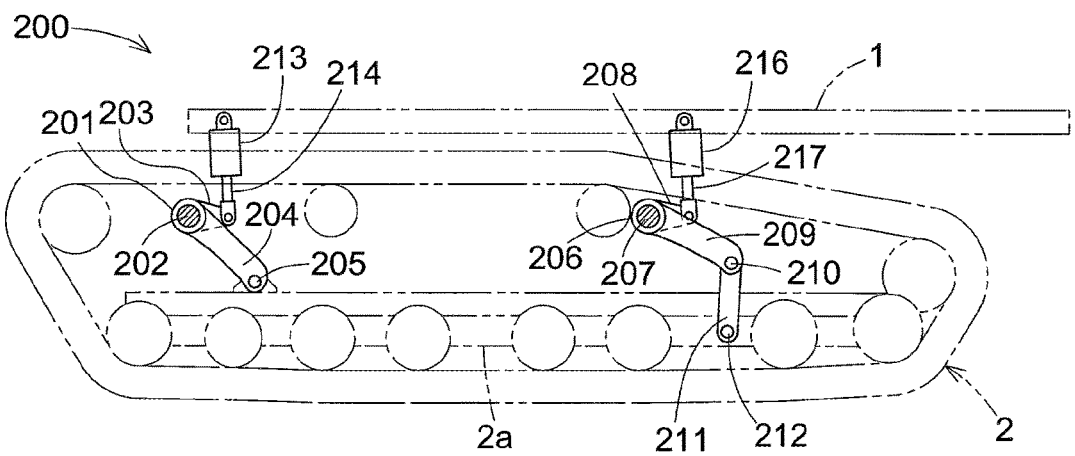
FIG. 14 is a side view showing a rolling operational state of the posture changing mechanism.
Figure 15:
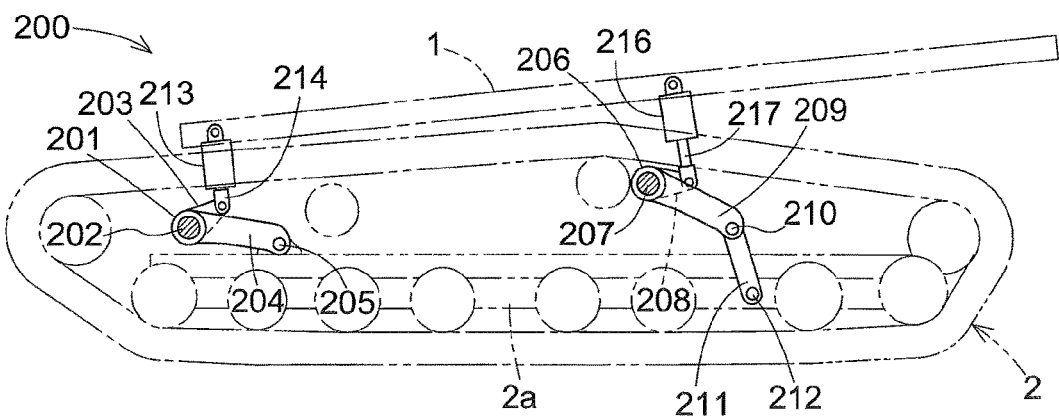
FIG. 15 is a side view showing a pitching operational state of the posture changing mechanism.

As schematically shown in FIG. 13, FIG. 14 and FIG. 15, between the vehicle body frame 1 and track frames 2a of the crawler type traveling devices 2, there is provided a posture changing mechanism 200 having a rolling function of elevating or lowering one of the left and right track frames 2a, thereby to render the vehicle body frame 1 horizontal relative to the left/right inclination of the vehicle body and a pitching function for elevating or lowering the front or rear of the track frames 2a, thereby to render the vehicle body frame 1 horizontal relative to front/rear inclination of the vehicle body.

At a front lower side of the vehicle body frame 1, a support metal 201 is provided and to this support metal 201, a shaft portion 202 in the vehicle body left/right direction is rotatably mounted to the support metal 201. To an inner side end portion of the shaft portion 202, a base portion of a front operational arm 203 is fixed and the end portion of the front operational arm 203 opposite the base portion is disposed on the vehicle body rear side. To an outer end portion of the shaft portion 202, a base portion of a front lifting arm 204 is fixed and the other end of the front lifting arm 204 is coupled to the track frame 2a via a shaft 205.

At a rear lower side of the vehicle body frame 1, a support metal 206 is provided and a shaft portion 207 in the vehicle body left/right direction is rotatably mounted to the support metal 206. To an inner end portion of the shaft portion 207, a base portion of a rear operational arm 208 is fixed and an end portion of the rear operational arm 208 opposite the base portion is located on the vehicle body rear side. To an outer end portion of the shaft portion 207, one end of a rear lifting first arm 209 is fixed and the other end of the rear lifting first arm 209 is attached to a shaft 210. To this shaft 210, a base portion of a rear lifting second arm 211 is pivotally attached and the other end of the rear lifting second arm 211 is coupled to the track frame 2a via a shaft 212.

To the end portion of the front operational arm 203, a piston rod 214 of a single action type hydraulic cylinder 213 for rolling is fitted. Between the front operational arm 203 and the vehicle body frame 1, the hydraulic cylinder 213 is disposed in the perpendicular direction. Further, to the end portion of the rear operational arm 208, a piston rod 217 of a single action type hydraulic cylinder 216 for rolling/pitching is fitted. Between the rear operational arm 208 and the vehicle body frame 1, the hydraulic cylinder 216 is disposed in the perpendicular direction.

Forwardly and rearwardly of the left and right track arms 2a, the two hydraulic cylinders 213, 216 are provided. As the respective hydraulic cylinder 213, 216 is activated independently and its operational amount is controlled, a pitching operation or a rolling operation of the vehicle body is effected. In case the rolling hydraulic cylinder 213 and the rolling/pitching hydraulic cylinder 216 are provided with a same cross sectional area arrangement, if the vehicle body is to effect a rolling action, the right or left hydraulic cylinder 213, 216 will be expanded or contracted by an equal amount. Whereas, if the vehicle body is to effect a pitching action, the left/right hydraulic cylinder 216 alone will be expanded or contracted.

As shown in FIG. 13, the front operational arm 203 and the front lifting arm 204 both extend toward the rear side of the vehicle body relative to the shaft portion 202. And, the length of the front operational arm 203 from the shaft portion 202 in the vehicle body rear direction is set equal to or shorter than the length of the front lifting arm 204 from the shaft portion 202 in the vehicle body rear direction. The hydraulic cylinder 213 is disposed along the perpendicular direction, which has a piston rod 214 which projects or retracts downwards at the end portion of such front operational arm 203.

Further, the rear operational arm 208 and the rear lifting first arm 209 and the rear lifting second arm 211 all extend toward the rear side of the vehicle body relative to the shaft portion 207. And, the length of the rear operational arm 208 from the shaft portion 207 in the vehicle body rear direction is set equal to or shorter than the length of the rear lifting first arm 209 and that of the rear lifting second arm 211 from the shaft portion 207 in the vehicle body rear direction. The hydraulic cylinder 216 is disposed along the perpendicular direction, which has a piston rod 217 which projects or retracts downwards at the end portion of such rear operational arm 208.

By controlling the hydraulic cylinders 213, 216 provided in the posture changing mechanism 200 described above, irrespectively of the ground surface condition, it is possible to create the horizontal posture of the traveling vehicle body 10 and to create also a lower limit posture which is a horizontal posture having an even lower ground-clearance.

As shown in FIG. 11 and FIG. 12, the grain discharging device 50 includes the bottom screw 51 provided at the bottom portion of the grain tank 5, the vertical feeding screw conveyer 52 provided at a vehicle body rear side of the grain tank 5 and the lateral feeding screw conveyer 53 extending upwardly of the threshing device 4.

Grains stored inside the grain tank 5 are fed from the bottom screw 51 via the vertical feeding screw conveyer 52 to the laterally feeding screw conveyer 53, and then discharged to the outside via the discharge opening 53A provided at the leading end of the laterally feeding screw conveyer 53. The vertical feeding screw conveyer 52 is configured to be pivotable about the vertical axis (y1) by an operation of the electric motor 54 and the laterally feeding screw conveyer 53 is configured to be vertically pivotable the horizontal axis X1 at the base end portion by the hydraulic cylinder 55. With this, the discharge opening 53A of the laterally feeding screw conveyer 53 can be fixed at a position where grains can be discharged onto a transporting truck or the like present outside the vehicle body. The posture position where the laterally feeding screw conveyer 53 is substantially horizontal and the laterally feeding screw conveyer 53 as a whole is confined within the outer contour of the harvesting machine as seen in the plane view is the home position of the laterally feeding screw conveyer 53 (home position of the grain discharging device 50) and at this home position, the laterally feeding screw conveyer 53 is fixed and held reliably from under by a holding device 57.

The bottom portion of the grain tank 5 is sloped such that a right bottom wall and a left bottom wall together form therebetween a wedge-like shape oriented downwards, and at its sharp end area, the bottom screw 51 is disposed. A left side wall 5A and a right side wall 5B connected with respective upper ends of the left bottom wall and the right bottom wall are substantially erect perpendicularly. With this arrangement of the grain tank 5, grains charged into the grain tank 5 will flow down towards the bottom screw 51.

As shown in FIG. 11, at a rear end portion of the grain tank 5, there is provided a turning supporting portion 15 as a tubular pivot shaft. A pivotal axis of this turning supporting portion 15 is the vertical axis X1 which is in agreement with the vertical axis (y1). So that, as indicated by dotted line in FIG. 12, the grain tank 5 can be pivoted horizontally on the outer side about the vertical axis X1. More particularly, the grain tank 5 can be position-changeable between a working position where the grain tank 5 can receive grains from the grain lifting device 41 and a maintenance position where the grain tank 5 projects laterally outwards to have its front side distant from the threshing device 4 to open up the rear side of the maneuvering portion 300 and the right side of the threshing device 4.

Figure 16:
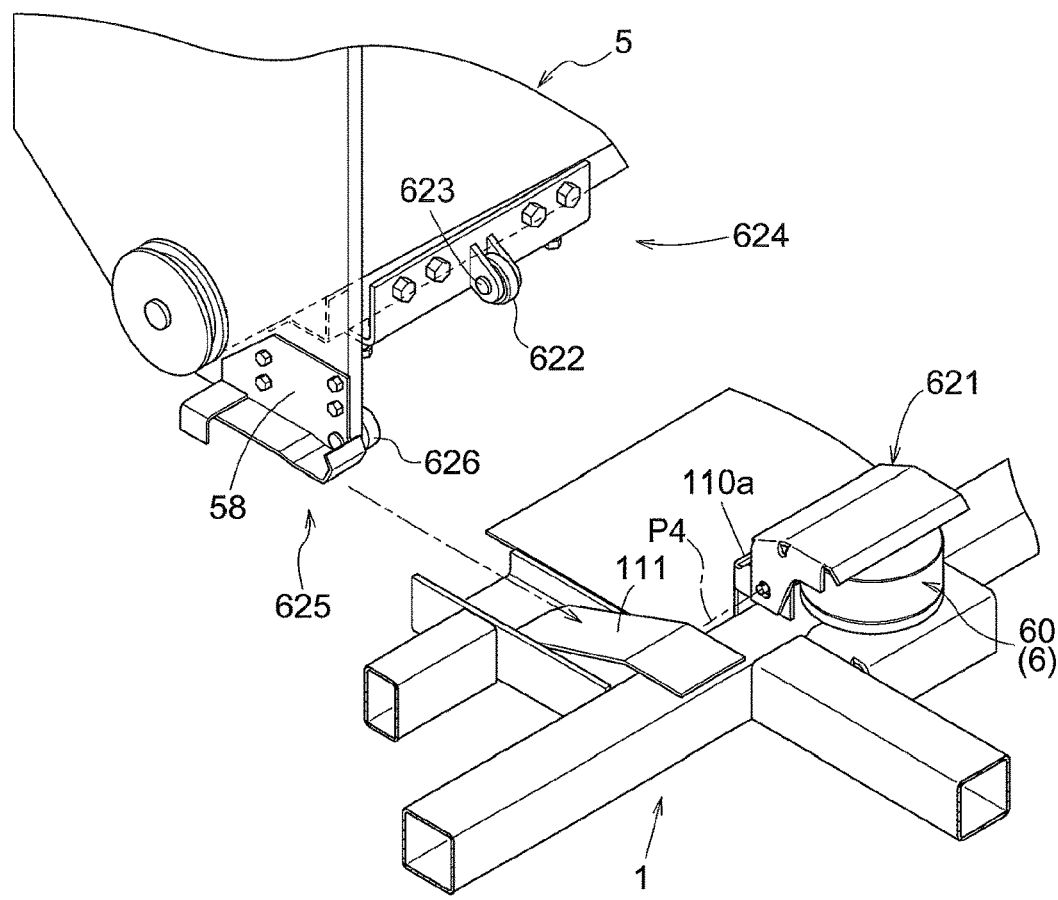
FIG. 16 is a perspective view showing a peripheral arrangement of a load cell for measuring a grain tank.
Figure 17:
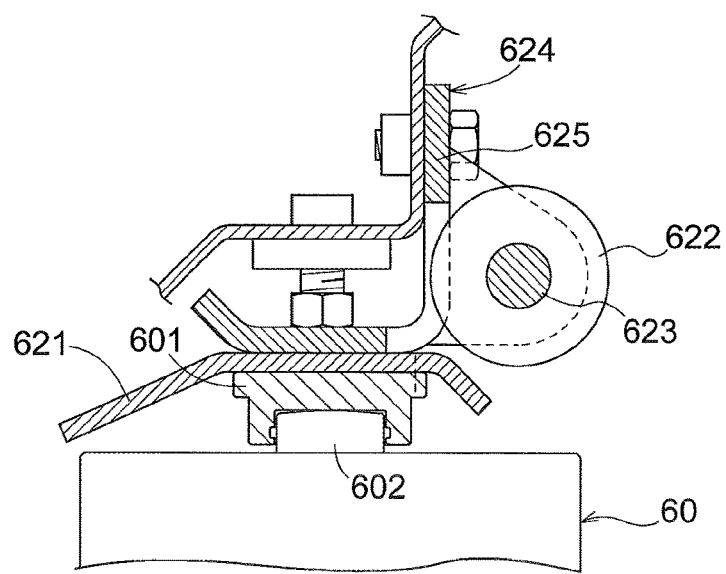
FIG. 17 is a section view showing the peripheral arrangement of the load cell for measuring the grain tank.

As shown in FIG. 11, FIG. 16 and FIG. 17, this combine includes the load cell 60 configured to output a weight of the grains stored in the grain tank 5 as a measurement result. FIG. 16 is a perspective view showing the load cell 60 and its periphery in the course of transition of the grain tank 5 from the maintenance position to the working position. FIG. 17 is a section view showing the load cell 60 and its periphery when the grain tank 5 has returned to the working position. At this position, the load cell 60 receives the weight of the grain tank 5 and outputs its weight as a measurement result. The load cell 60 is mounted on the vehicle body frame 1 and a receiving guide piece 621 for guiding the lower portion of the grain tank 5 toward a weight detecting portion 602 of the load cell 60 is disposed in such a manner as to cover the load cell 60. In association with a pivotal motion of the grain tank 5 from the maintenance position to the working position, the receiving guide piece 621 guides the grain tank 5 to a position upwardly of the weight detecting portion 602 of the load cell 60, while receiving and supporting the lower end of this grain tank 5. And, at this position, weight measurement of the grain tank 5 by the load cell 60 is effected. In the receiving guide piece 621, there is formed a sloped face so as to guide the grain tank 5 while lifting up this grain tank 5 in association with the pivotal motion of the grain tank 5 from the maintenance position to the working position. A flat face further extends from this sloped face and at the leading end thereof located at its end is formed as a downwardly inclined sloped face.

The receiving guide piece 621 has a skirt portion and is pivotally supported via a pivot pin to be pivotable about a vehicle body front/rear axis P4 along the vehicle body front/rear direction, relative to a bracket 110a fixed to the vehicle body frame 1. The weight detecting portion 602 of the load cell 60 is covered from above with a cap member 601 having a downwardly oriented tubular shape. Therefore, at the working position of the grain tank 5, an upper face of the cap member 601 contacts a lower face of the receiving guide piece 621 and the lower face of the cap member 601 contacts the pressure receiving face 63A of the weight detecting portion 602 from above. Namely, the load of the front side of the grain tank 5 is received by the load cell 60 via the receiving guide piece 621 and the cap member 601.

Further, to the lower portion of the grain tank 5, there is attached an angle-like supporting deck 624, and to a vertical wall of this supporting deck 624, a roller 622 is rotatably supported via a horizontal support shaft 623. In order to allow the roller 622 to be contacted and guided by the receiving guide piece 621, the lower end of the roller 622 is disposed downwardly of the lower face of the horizontal wall of the supporing deck 624. Thus, when the roller 622 is being guided by the receiving guide piece 621, the horizontal wall of the supporting deck 624 does not contact the receiving guide piece 621 and the horizontal wall of the supporting deck 624 comes into face contact with the flat face of the receiving guide piece 621 only when the roller 622 is detached from the leading end portion of the receiving guide piece 621. In order to ensure this face contact, the supporting deck 624 is attached to the grain tank 5 to be height-adjustable via an adjustment mechanism. This adjustment mechanism, as shown in FIG. 17, can be formed simply by a combination of a fixing bolt for fixing the supporting deck 624 with using e.g. an elongate hole and an adjustment bolt whose upper end is to be pressed against the lower face of the grain tank 5.

Further, under the grain tank 5 and adjacent the supporting deck 624, there is provided an assisting guiding body 625. This assisting guiding body 625 is a sled-like member attached to a front face of a holder 58 and includes an assisting roller 626. When the grain tank 5 is moved from the maintenance position to the working position, the assisting roller 626 rolls on and along a sloped face of a sloped deck 111 provided in the vehicle body frame 1. The assisting guiding body 625 and the sloped deck 111 are designed to have a relative positional relationship such that when the roller 622 passes through the receiving guiding body 621, the assisting roller 626 too moves away from the sloped deck 111. More particularly, at the working position of the grain tank 5, the roller 622 and the assisting roller 626 are afloat, and in a stable condition wherein the lower face of the horizontal wall of the supporting deck 624 and the flat face of the receiving guiding piece 621 are in face-contact with each other, the weight of the grain tank 5, consequently, the weight (yield) of grains stored in the grain tank 5, is measured by the load cell 60.

Figure 18:
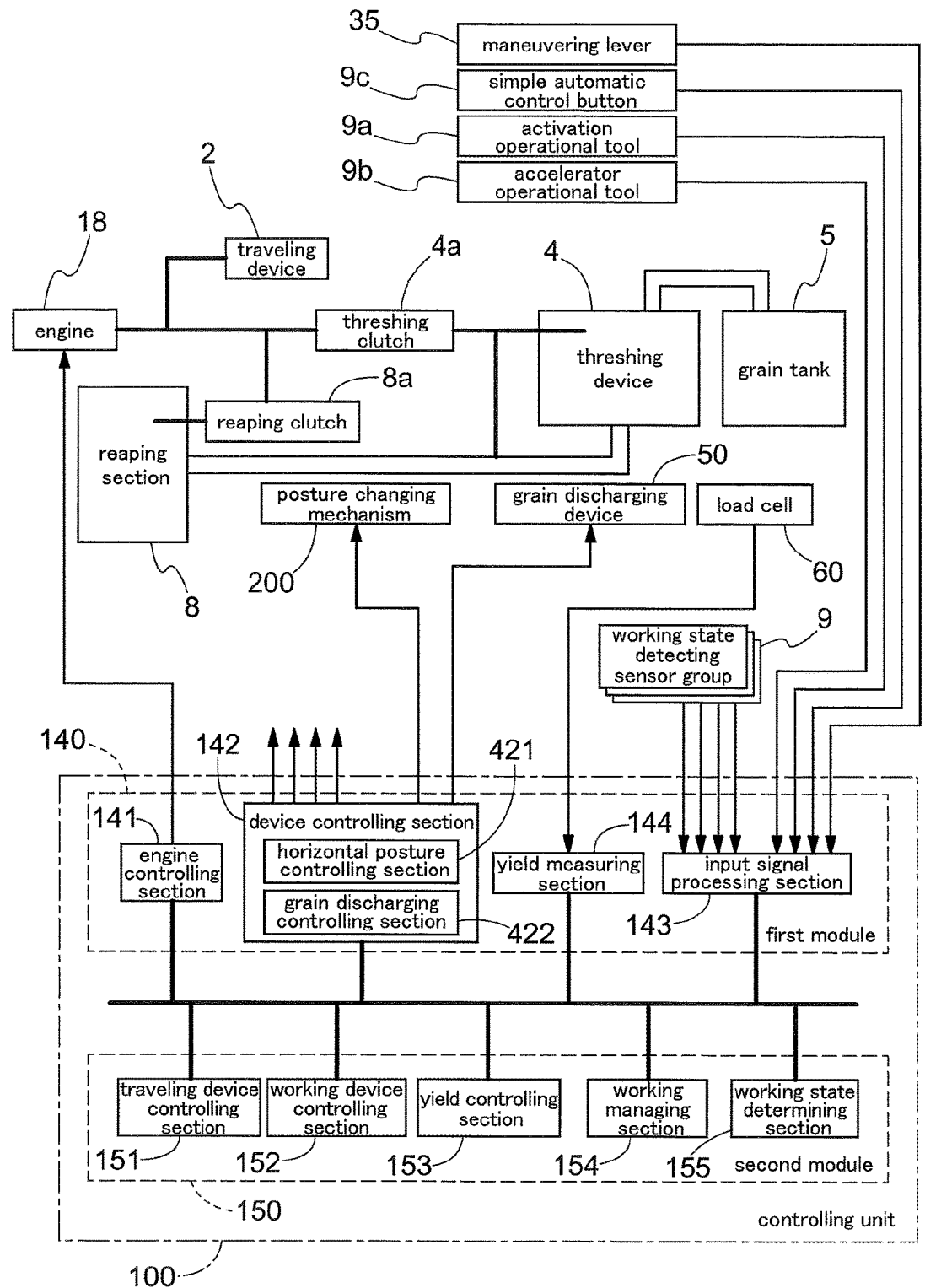
FIG. 18 is a functional block diagram showing controlling functional sections relating to yield measurement at the time of simple automatic control.

FIG. 18 is a functional block diagram showing functional elements relating to yield measurement at the time of the simple automatic control in the control system. The control function and flow of control of the combine of the instant embodiment apply to the basic principle described hereinbefore with reference to FIG. 10. A controlling unit 100 shown in FIG. 18 is divided, for the sake of convenience, into a first module 140 for effecting signal exchanges directly with the operational devices of the combine and a second module 150 for effecting control data exchange with the first module 140. The first module 140 and the second module 150 are connected to each other via signal transmission lines, a vehicle-mounted LAN, and other data transmission lines.

The first module 140 includes the engine controlling section 141, the device controlling section 142, an input signal processing section 143 and the yield measuring section 144. The engine controlling section 141 controls the rotational speed of the engine 18. The device controlling section 142 controls the various operational devices of the combine. In particular, the horizontal posture controlling section 421 of the device controlling section 142 has the function of setting the vehicle body frame 1 to the horizontal posture by controlling the posture changing mechanism 200. The grain discharging controlling section 422 has the function of discharging stored grains from the gran tank 5 to the outside by controlling the grain discharging device 50. The input signal processing section 143 inputs signals from the manual operational devices such as the activation operational tool 9a, the accelerator operational tool 9b, the simple automatic control button 9c, and the maneuvering lever 35 and also signals from the working state detecting sensor group 9 such as the sensors, switches for detecting states of the devices constituting the combine and forwards them to the various functional sections of the controlling unit 100. The working state detecting sensor group 9 includes e.g. a speed detector for detecting stop of the combine, a detector for detecting transition to the horizontal posture as the home position of the vehicle body horizontal posture controlling mechanism mounted on the combine, a detector for detecting a state of a clutch for controlling power transmission to the reaping section 8 or the threshing device 4, a detector for detecting the home position of the grain discharging device 50 (the storing position of the grain discharging device 50) when this is held and fixed to the holding device 57 of the lateral feeding screw conveyer 53, and so on. The yield measuring section 144 measures a yield of grains stored in the grain tank 5 based on a measurement result of the load cell 60, by subtracting the weight of the grain tank 5 from the measured weight obtained from the measurement result of the load cell 60.

The second module 150 includes a traveling device controlling section 151, a working device controlling section 152, the yield controlling section 153, the working managing section 154, and the working state determining section 155. The traveling device controlling section 151 generates a controlling instruction for driving control for the traveling devices 2, based on an operational instruction via the maneuvering device received via the input signal processing section 143. The controlling instruction generated by the traveling device controlling section 151 is sent to the operational devices such as the speed changing mechanism via the device controlling section 142. The working device controlling section 152 similarly generates a controlling instruction for effecting driving control for the reaping section 8, the threshing device 4 or their peripheral devices, based on an operational instruction from a working operational device and detection signals of e.g. the working state detecting sensor group 9. The controlling instruction generated by the working device controlling section 152 is sent to the operational devices such as the speed changing mechanism via the device controlling section 142. Incidentally, in the above discussion, the horizontal posture controlling section 421 and the grain discharging controlling section 422 have been explained separately for the sake of convenience of explanation. It should be noted that the horizontal posture controlling section 421 and the grain discharging controlling section 422 can optionally be incorporated in the working device controlling section 152.

The foregoing explanation using FIG. 10 can be applied to the respective functions of the yield controlling section 153, the working managing section 154 and the working state determining section 155. The working state determining section 155 has the function of determining whether the combine is under a working state or a non-working state, based on detection signals of e.g. the working state detecting sensor group 9. The working managing section 154, in the instant embodiment, manages the simple automatic control for executing an ON setting of the threshing clutch 4a, an ON setting of the reaping clutch 8a, and also engine rotational speed automatic control for rotating the engine 18 at a low speed at the time of non-working, in cooperation with each other. The simple automatic control under the management of the working managing section 154 is activated by the simple automatic control button 9c. With the working managing section 154 in operation, when the working state determining section 155 determines that the combine is under the working state, a working mode which provides a high speed rotation instruction to the engine controlling section 141 is set for this controlling unit 100. Further, with this working managing section 154 in operation, when the working state determining section 155 determines that the combine is under the non-working state, a non-working mode is set to this controlling unit 100 which provides a low speed rotation instruction to the engine controlling section 141.

The yield controlling section 153 has the function of managing yield measurement by the yield measuring section 144. The yield measuring section 144 sets a measurement value/yield conversion table for use in deriving a yield from a measured value as measurement result of the load cell 60. Further, the yield controlling section 153, when triggered by an activation signal for activating yield measurement by the activation operational tool 9a, generates and provides various instructions for the various functional sections, in consideration to e.g. whether the controlling unit 100 is under the simple automatic control state or not or a mode set in the controlling unit 100 (working mode or non-working mode), etc.

For instance, when the controlling unit 100 is under the simple automatic control state, if the non-working mode is set, the working managing section 154 provides a low speed rotation instruction to the engine controlling section 141 for the sake of energy saving and provides a high speed rotation instruction thereto for the sake of more effective harvesting work, when the working mode is set. When the non-working mode is set under the simple automatic control state, if a yield measurement is requested based on an activation signal from the activation operational tool 9a, then the yield controlling section 153 temporarily suspends or halts the simple automatic control function by the working managing section 154 and forcibly provides the high speed rotation instruction to the engine controlling section 141. Subsequently, the yield controlling section 153 provides the horizontal posture controlling section 421 with a horizontal posture instruction for setting the vehicle body frame 1 to the horizontal posture. With this, the posture changing mechanism 200 can effect a posture changing operation with sufficient power from the engine 18. Simultaneously, the yield controlling section 153 provides the grain discharging controlling section 422 with a basic state instruction to cause the grain discharging device 50 to be moved to the home position, in case this grain discharging device 50 is currently not under the home position state suitable for yield measurement. Upon completions of the posture change to the horizontal posture and the shifting of the grain discharging device 50 to the home position, the yield controlling section 153 provides the yield measuring section 144 with a yield measurement instruction. With this, the yield measuring section 144 effects yield measurement and obtains a measured value from the load cell 60 and a yield is calculated. Incidentally, in case the activation signal provided by the activation operational tool 9a is linked with a grain discharging work, then, upon completion of the yield measurement, the yield controlling section 153 provides the grain discharging controlling section 422 with a starting command for substantial grain discharging work.

The controlling unit 100 stores the yield calculated by the yield measuring section 144 in a memory. In this, a field name, a harvested product type, etc. too will be recorded as property values of the yield.

Incidentally, the division of the functional sections included in the controlling unit 100 shown in FIG. 10 or FIG. 18 is only exemplary. Integration of the respective functional sections and division of the respective functional sections can be made as desired. Any arrangement can be employed as long as such allows realization of the controlling functions of the present invention. And, such functions can be realized in the form of hardware and/or software.

Such manual operational devices as the activation operational tool 9a, the accelerator operational tool 9b, the simple automatic control button 9c, the maneuvering lever 35 can alternatively be realized as mechanical type or can be realized also by software operational components to be arranged on a touch panel. Further alternatively, such manual operational devices can be used in any desired combinations.

INDUSTRIAL APPLICABILITY

The present invention is applicable not only to the self-threshing type combine, but also to a standard type combine and is applicable also to any agricultural product harvester such as a cone harvester or the like, in addition to the combine.

DESCRIPTION OF REFERENCE MARKS/NUMERALS

1: vehicle body frame
2: traveling device
4: threshing device
4a: threshing clutch
5: grain tank
5A: left side wall
5B: right side wall
5C: front wall
6: weight detecting mechanism
8: reaping section
8a: reaping clutch
9: working state detecting sensor group
9a: activation operational tool
9b: accelerator operational tool
9c: simple automatic control button
13: load cell supporting frame
13A: bottom face (load cell mounting portion)
18: engine
50: grain discharging device
51: bottom screw
60: load cell
60A: lower side detecting portion
60B: upper side detecting portion
63: detecting portion
63A: pressure receiving face
70: guide roller
80A: contacting face
100: controlling unit
140: first module
141: engine controlling section
142: device controlling section
143: input signal processing section
144: yield measuring section
150: second module
151: traveling device controlling section
152: working device controlling section
153: yield controlling section
154: working managing section
155: working state determining section
200: posture changing mechanism
421: horizontal posture controlling section

The invention claimed is:
1. A combine comprising:
a vehicle body frame mounting an engine;
an engine controlling section for controlling a rotational speed of the engine;
a posture changing mechanism for varying a posture of the vehicle body frame by an operation of an actuator that uses power from the engine;
a horizontal posture controlling section for setting the vehicle body frame to a horizontal posture by controlling the posture changing mechanism;
a grain tank mounted on the vehicle body frame and configured to store grains conveyed from a threshing device;
a load cell for measuring a weight of the grain tank;
a yield measuring section for measuring a yield of the grains stored in the grain tank based on a measurement result of the load cell;
an activation operational tool that outputs an activation signal for activating a yield measurement by the yield measuring section; and
a yield controlling section configured to provide a high-speed rotation instruction for causing the engine to be driven at a rated rotational speed to the engine controlling section, in response to the activation signal and configured also to provide a horizontal posture instruction for setting the vehicle body frame to a horizontal posture to the horizontal posture controlling section by an operation of the posture changing mechanism.

2. The combine of claim 1, further comprising:
a working state determining section for determining whether the combine is under a working state or a non-working state;
a working managing section for setting a non-working mode in which the engine controlling section is provided with a low-speed rotation instruction for driving the engine at a zero-load rotational speed if the working state determining section determines that the combine is under the non-working state, and setting a working mode in which the engine controlling section is provided with the high-speed rotation instruction if the working state determining section determines that the combine is under the working state; and
wherein the yield controlling section, when receiving the activation signal, provides the high-speed rotation instruction to the engine controlling section, with priority over the working managing section, irrespectively of a mode set by the working managing section.

3. The combine of claim 2, wherein there is provided an accelerator operational tool configured to provide the engine controlling section with a desired rotational speed instruction for causing the engine to be driven at a desired rotational speed when the function of the working managing section is deactivated.

4. The combine of claim 2, wherein if the yield measurement by the activation signal is completed during execution of control by the yield controlling section with priority over the working managing section, the priority of the yield controlling section over the working managing section is cancelled.

5. The combine of claim 1, wherein:
a grain discharging device for discharging grains stored in the grain tank to the outside is provided; and
in response to the activation signal, at least one of the following is effected: (i) a power shutoff to a reaping work device, (ii) a return of the reaping work device to a non-working position, and (iii) fixing a movable device constituting the grain discharging device.

6. The combine of claim 1, wherein:
a grain discharging bottom screw is provided at a bottom portion of the grain tank and a contacting portion is provided outside downwardly of a portion in the grain tank where the bottom screw is located; and
the load cell has a detecting portion configured to come into contact with the contacting portion at a position higher than the vehicle body frame and the load cell is mounted and supported on a load cell mounting portion provided at a position lower than the vehicle body frame.

7. The combine of claim 6, wherein the contacting portion has a downwardly oriented contacting face which comes into direct contact with an upper face of the detecting portion.

8. A combine comprising:
a vehicle body frame;
a grain tank mounted on the vehicle body frame and having a downwardly narrowed shape, the grain tank being configured to store grains conveyed from a threshing device;
a grain discharging bottom screw provided at a bottom portion of a downwardly narrow portion inside the grain tank; and
a load cell configured to measure a weight of the grain tank;
wherein a contacting portion is provided outside downwardly of a position where the bottom screw is located in the grain tank; and
the load cell has a detecting portion configured to come into contact with the contacting portion at a position higher than the vehicle body frame and the load cell is mounted and supported on a load cell mounting portion provided at a position lower than the vehicle body frame.

9. The combine of claim 8, wherein the contacting portion has a downwardly oriented contacting face which comes into direct contact with an upper face of the detecting portion.

10. The combine of claim 8, wherein a front wall of the grain tank includes a front portion supporting plate for supporting a front end side of the bottom screw and the contacting portion is attached to a lower end of the front portion supporting plate.

11. The combine of claim 8, wherein:
the grain tank is configured to be position changeable between a storing position preset on the vehicle body frame and a non-storing position displaced laterally outside of the storing position relative to a vehicle body of the combine;
a guiding face is provided on the vehicle body frame;
the contacting portion comes into contact with the detecting portion when the grain tank is located at the storing position; and
the grain tank includes a guide roller that rolls on the guiding face while supporting a weight of the grain tank to guide the grain tank from the non-storing position side to the storing position side.

12. The combine of claim 11, wherein the guiding face defines a recess portion in which the guide roller drops at the storing position.

13. The combine of claim 11, wherein:
a front wall of the grain tank includes a front portion supporting plate for supporting a front end side of the bottom screw;
a cutout portion that is upwardly recessed is provided at a lower edge side of the front portion supporting plate; and
a supporting shaft of the guide roller is supported as being fitted in the cutout portion.

14. The combine of claim 11, wherein:
the guiding face is configured to cover the load cell at a position lower than an upper face of the detecting portion; and
the guiding face defines an opening for exposing an upper face of the detecting portion therethrough.

* * * * *